US012756961B2

(12) United States Patent
Alaettinoglu et al.

(10) Patent No.: US 12,756,961 B2
(45) Date of Patent: Oct. 6, 2026

(54) INTERWORKING BETWEEN VARIABLE CAPACITY OPTICAL LAYER AND ETHERNET/IP/MPLS LAYER

(71) Applicant: Ciena Corporation, Hanover, MD (US)

(72) Inventors: Cengiz Alaettinoglu, Sherman Oaks, CA (US); Gerard Leo Swinkels, Ottawa (CA); Ian Hamish Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 380 days.

(21) Appl. No.: 18/287,146

(22) PCT Filed: Aug. 29, 2022

(86) PCT No.: PCT/US2022/041810

§ 371 (c)(1),
(2) Date: Oct. 16, 2023

(87) PCT Pub. No.: WO2023/038818

PCT Pub. Date: Mar. 16, 2023

(65) Prior Publication Data

US 2024/0323117 A1 Sep. 26, 2024

Related U.S. Application Data

(63) Continuation of application No. 17/546,362, filed on Dec. 9, 2021, now Pat. No. 11,785,365.

(Continued)

(51) Int. Cl.

*H04Q 11/00* (2006.01)
*H04B 10/27* (2013.01)

(Continued)

(52) U.S. Cl.

CPC ......... *H04Q 11/0066* (2013.01); *H04B 10/27* (2013.01); *H04L 41/082* (2013.01);

(Continued)

(58) Field of Classification Search

CPC ....... H04Q 11/0066; H04Q 2011/0081; H04Q 2011/0084; H04Q 2011/0086;

(Continued)

(56) References Cited

U.S. PATENT DOCUMENTS

| | | | |
|---|---|---|---|
| 6,795,394 | B1 | 9/2004 | Swinkels et al. |
| 6,996,342 | B2 | 2/2006 | Park et al. |

(Continued)

FOREIGN PATENT DOCUMENTS

| | | | |
|---|---|---|---|
| WO | 2014053175 | A1 | 4/2014 |

OTHER PUBLICATIONS

Tomkos et al., "A Tutorial on Flexible Optical Networking Paradigm: State of the Art Trends, and Research Challenges," vol. 102, No. 9, Sep. 2014, pp. 1317-1337.

(Continued)

*Primary Examiner* — Pranesh K Barua
(74) *Attorney, Agent, or Firm* — Baratta Law PLLC; Lawrence A. Baratta, Jr.

(57) ABSTRACT

Systems and methods for coordinating an optical layer and a packet layer in a network, include a Software Defined Networking (SDN) Internet Protocol (IP) application configured to implement a closed loop for analytics, recommendations, provisioning, and monitoring, of a plurality of routers in the packet layer; and a variable capacity application configured to determine optical path viability, compute excess optical margin, and recommend and cause capacity upgrades and downgrades, by communicating with a plurality of network elements in the optical layer, wherein the SDN IP application and the variable capacity application coordinate activity therebetween based on conditions in the network. The activity is coordinated based on underlying capacity changes in the optical layer and workload changes in the packet layer.

14 Claims, 18 Drawing Sheets

Related U.S. Application Data

(60) Provisional application No. 63/242,680, filed on Sep. 10, 2021.

(51) Int. Cl.
*H04L 41/082* (2022.01)
*H04L 45/302* (2022.01)
*H04L 45/50* (2022.01)
*H04L 47/125* (2022.01)
*H04L 47/22* (2022.01)

(52) U.S. Cl.
CPC ............ *H04L 45/306* (2013.01); *H04L 45/50* (2013.01); *H04L 47/125* (2013.01); *H04L 47/225* (2013.01); *H04Q 2011/0081* (2013.01); *H04Q 2011/0084* (2013.01); *H04Q 2011/0086* (2013.01)

(58) Field of Classification Search
CPC ..... H04B 10/27; H04L 41/082; H04L 45/306; H04L 45/50; H04L 47/125; H04L 47/225
See application file for complete search history.

(56) References Cited

U.S. PATENT DOCUMENTS 7,120,792 B1 10/2006 Jacobson et al.
7,197,573 B1 3/2007 Jacobson et al.
7,539,191 B1 5/2009 Jacobson et al.
7,995,569 B2 8/2011 Ashwood-Smith et al.
8,085,676 B2 12/2011 Skalecki et al.
8,135,834 B1 3/2012 Jacobson et al.
8,184,526 B2 5/2012 Duncan et al.
8,274,901 B1 9/2012 Casner et al.
8,305,884 B2 11/2012 Ghodrat et al.
8,355,333 B2 1/2013 Gazier et al.
8,396,950 B1 3/2013 Sandick et al.
8,422,502 B1 4/2013 Alaettinoglu et al.
8,553,707 B2 10/2013 Swinkels et al.
8,750,706 B2 6/2014 Boertjes et al.
8,776,161 B2 7/2014 Gazier et al.
8,787,170 B2 7/2014 Ong et al.
8,787,394 B2 7/2014 Bragg et al.
8,824,331 B1 9/2014 Alaettinoglu et al.
8,879,904 B1 11/2014 Harley et al.
8,885,634 B2 11/2014 Ghodrat et al.
8,937,946 B1 1/2015 Kanna et al.
9,025,435 B2 5/2015 Holness et al.
9,026,674 B1 5/2015 Kanna et al.
9,077,474 B2 7/2015 Boertjes et al.
9,094,337 B2 7/2015 Bragg et al.
9,118,421 B2 8/2015 Swinkels et al.
9,124,960 B2 9/2015 Swinkels et al.
9,191,280 B2 11/2015 Swinkels et al.
9,258,190 B2 2/2016 Swinkels et al.
9,357,278 B2 5/2016 Swinkels et al.
9,407,359 B2 8/2016 Swinkels et al.
9,628,172 B2 4/2017 Prakash et al.
9,667,570 B2 5/2017 Swinkels et al.
9,832,548 B2 11/2017 Moynihan et al.
9,906,294 B2 2/2018 Al Sayeed et al.
9,918,148 B2 3/2018 Swinkels et al.
9,936,047 B2 4/2018 Adolph et al.
10,148,384 B2 12/2018 Swinkels et al.
10,200,770 B2 2/2019 Swinkels et al.
10,284,661 B2 5/2019 Skalecki et al.
10,341,258 B2 7/2019 Sareen et al.
10,432,342 B1 10/2019 Bathula et al.
10,686,699 B2 6/2020 Duncan et al.
10,750,260 B1 * 8/2020 Gareau .............. H04Q 11/0071
11,057,278 B1 7/2021 Côté et al.
2005/0286425 A1 12/2005 Nagesh et al.
2008/0082649 A1 4/2008 Gazier et al.
2011/0219128 A1 9/2011 Swinkels et al.
2013/0007230 A1 1/2013 Skalecki et al.
2014/0044008 A1 2/2014 Skalecki et al.
2014/0177637 A1 6/2014 Duncan et al.
2015/0304159 A1 10/2015 Sharma et al.
2016/0050470 A1 2/2016 Swinkles et al.
2016/0057049 A1 2/2016 Jacobson et al.
2016/0105380 A1 4/2016 Chhillar et al.
2016/0182329 A1 6/2016 Armolavicius et al.
2016/0191386 A1 6/2016 Swinkels et al.
2016/0380818 A1 12/2016 Swinkels et al.
2016/0380880 A1 12/2016 Swinkels et al.
2017/0230267 A1 * 8/2017 Armolavicius ....... H04L 43/062
2017/0317744 A1 11/2017 Skalecki et al.
2017/0331703 A1 11/2017 Sui
2018/0013613 A1 1/2018 Skalecki et al.
2018/0220210 A1 * 8/2018 Paraschis ........... H04Q 11/0071
2018/0239522 A1 8/2018 Campbell et al.
2018/0262421 A1 9/2018 Skalecki et al.
2019/0215586 A1 7/2019 Swinkels et al.
2019/0245787 A1 8/2019 Skalecki et al.
2019/0327188 A1 10/2019 Rivaud et al.
2020/0007236 A1 1/2020 Choudhury et al.
2020/0259700 A1 8/2020 Bhalla et al.
2021/0099378 A1 4/2021 Alaettinoglu et al.
2022/0038798 A1 2/2022 Zhang et al.
2023/0022416 A1 * 1/2023 Su .......................... H04B 10/27

OTHER PUBLICATIONS

Dec. 13, 2022, International Search Report and Written Opinion for International Application No. PCT/US2022/041810.

* cited by examiner

Finer granularity of line rate speeds leads to better utilization of the available margin in the network Network programmability and automation requires instrumented hardware and Open APIs

82

| | 400ZR | OpenZR+ |
|---|---|---|
| Form Factor | QSFP-DD | QSFP-DD |
| Baud | 60 | 60 |
| SD-FEC | CFEC | oFEC |
| DWDM Nodes | >2 degree ROADM | >2 degree ROADM |
| Add-drop Filter | Fixed, 75GHz | Fixed, 75GHz |
| Fiber Type | G.652 | G.652 |
| Span Length | 80km | 80km |
| Span Fill | 75% | 75% |
| Ideal 400G Reach | 100km | 300km |
| Realized Reach | 80km | 240km |

FIG. 14
Tunnel Recommendations
Traffic Matrix: Business
Policy: Minimum Tunnels
Before
After
100+%
45%
Max Link Utilization
Before 12 ms After 12 ms
Max Delay
Before 3 After 3
Max Hops
Response time as a function of Utilization: m/m/n
Response Time
Utilization
8 Recommendations
Recommendations
Filter
Tunnel
Head end
Tail end
Hops
Reserved B/W
Recommendation
Description
Business_MinimumTunnels_10.5.0.100
west-edge
east-edge
425.000M
Add Tunnel
Show Map
First
Previous
Next
Last

FIG. 15
Transport services
18 / 38 Services
Sort by
SNR margin
Enter keyword(s)
Export
Create
CMG_RESTORE
LQS_EOL
CMG_400
LQS_CMG
LQS_CMG
Photonic | OTSi | 200G
Photonic | OTSi | 300G
Photonic | OTSi | 400G
ALDERAAN 1-13-1
JAKKU 1-31-1
DAGOBAH 1-14-1
TATOOINE 1-14-1
CORELLIA 11-4-3,11-4-4
Discovered

INTERWORKING BETWEEN VARIABLE CAPACITY OPTICAL LAYER AND ETHERNET/IP/MPLS LAYER

CROSS-REFERENCE TO RELATED APPLICATION(S)

The present disclosure is a national stage of PCT/US2022/041810, filed Aug. 29, 2022, which claims priority to U.S. patent application Ser. No. 17/546,362, filed Dec. 9, 2021, which claims priority to U.S. Provisional Patent Application No. 63/242,680, filed Sep. 10, 2021, the contents of each are incorporated by reference in their entirety.

FIELD OF THE DISCLOSURE

The present disclosure generally relates to networking. More particularly, the present disclosure relates to systems and methods for coordinated Internet Protocol (IP)/Multiprotocol Label Switching (MPLS) and optical capacity engineering and maximizing non-channelized router port capacity.

BACKGROUND OF THE DISCLOSURE

Optical networks support variable bit-rate coherent optics, a flexible grid reconfigurable photonic layer, and Software Defined Networking (SDN) control to improve visibility, automate processes, and increase network capacity and service availability. An example of this is described in commonly-assigned U.S. Pat. No. 10,148,384, the contents of which are incorporated by reference. That is, coherent optical networks can support variable capacity that is ideal for taking channels up and down (e.g., Optical Payload Units (OPUs) in a channelized interface). Data networks are more efficient when provided one large channel rather than several small channels. While the optical layer efficiently manages the physical layer and its interface, the data layer is left out of the picture and assumes that the underlying interface has not experienced a rate change and attempts to use the interface at the original rate.

Router port rates follow the Ethernet standard rates which are not as plentiful as the optical line rates. Therefore, there are lots of optical line operating regimes where capacity is available to be harvested. Channelizing the router port works but is not desirable due to statistical multiplexing inefficiencies, i.e., today's variable capacity.

BRIEF SUMMARY OF THE DISCLOSURE

The present disclosure relates to systems and methods for coordinated Internet Protocol (IP)/Multiprotocol Label Switching (MPLS) and optical capacity engineering and maximizing non-channelized router port capacity.

The present disclosure includes coordination of IP and optical layers to handle the capacity change in a variable capacity optical layer as well as proactively preparing IP network for the changes in the optical layer. This includes modifying an IP topology model of the network with increased or decreased link capacities, and optimizing new IP paths using global traffic engineering. This includes deploying new IP paths/routes proactively with changing the optical service capacity. The present disclosure relies on a variable capacity optical layer based on available optical margin and packet traffic engineering. The present disclosure measures both the actual real wavelength capacity (as-is and also possible future orderly reconfiguration based on available margin) and the actual presented workload; and then computing from the set of available potential dynamic changes in both the optical and the IP layers to render the "best network" under current and anticipated future conditions. Also, the present disclosure includes an ability to move away from standard Ethernet interface rates to the more plentiful (in terms of choices) optical line rates.

Also, the present disclosure utilizes standard Ethernet interface rates between the router Application Specific Integrated Circuit-ASIC's interface and the transceiver client. Setting the modem client interface mode into idle mapping procedure (IMP—from bit mode to frame mode). A port shaper rate is assigned to the optical line rate, the IP link capacity can be configured to be the shaper rate (optical line rate), instead of the port speed. And policies are reflective of the IP link capacity, not the port speed.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. The steps include implementing a closed loop for analytics, recommendations, provisioning, and monitoring, of a plurality of routers in the packet layer; determining optical path viability, computing excess optical margin, and recommending and causing capacity upgrades and downgrades, by communicating with a plurality of network elements in the optical layer; and coordinating the implementing and the determining steps with one another for adjustments in the network based on conditions in the network.

The coordinating can be based on underlying capacity changes in the optical layer and/or workload changes in the packet layer. The steps can further include, responsive to congestion in the packet layer, deploying new routes via any of changing link capacity, changing link metrics, changing Segment Routing Policy candidate paths, and changing RSVP-TE tunnels. The steps can further include, responsive to a change in capacity in the optical layer including fiber-cuts, the coordinating includes determining restoration at the optical layer including partial restoration. The partial restoration can include determining a path with a possible capacity and performing traffic engineering to adjust any services to the possible capacity.

The steps can further include, responsive to congestion in the packet layer, the coordinating includes determining possible capacity upgrades at the optical layer on congested links, and performing traffic engineering to adjust any services on the congested links to the possible capacity upgrades. The steps can further include operating with an SDN controller that communicates with the network. The steps can further include implementing changes in the optical layer and the packet layer by the SDN controller; and setting link metrics to protect packets in flight prior to any changes at the optical layer. Adjustments in the packet layer from the SDN IP application can include utilizing non-standard Ethernet rates. The non-standard Ethernet rates can be set by setting a shaper on a router interface to match an optical line rate.

In another embodiment, a system for coordinating an optical layer and a packet layer in a network, the system is configured to operate on one or more processors, and the system includes a Software Defined Networking (SDN) Internet Protocol (IP) application configured to implement a closed loop for analytics, recommendations, provisioning, and monitoring, of a plurality of routers in the packet layer;

and a variable capacity application configured to determine optical path viability, compute excess optical margin, and recommend and cause capacity upgrades and downgrades, by communicating with a plurality of network elements in the optical layer, wherein the SDN IP application and the variable capacity application coordinate activity therebetween based on conditions in the network.

The activity can be coordinated based on underlying capacity changes in the optical layer and/or workload changes in the packet layer. Responsive to congestion in the packet layer, the SDN IP application can be configured to deploy new routes via any of changing link capacity, changing link metrics, changing Segment Routing Policy candidate paths, and changing RSVP-TE tunnels. Responsive to a change in capacity in the optical layer including fiber-cuts, the activity can be coordinated by determining restoration at the optical layer including partial restoration. The partial restoration can include the variable capacity application determining a path with a possible capacity and the SDN IP application performs traffic engineering to adjust any services to the possible capacity.

Responsive to congestion in the packet layer, the variable capacity application can be configured to determine possible capacity upgrades at the optical layer on congested links, and the SDN IP application performs traffic engineering to adjust any services on the congested links to the possible capacity upgrades. The SDN IP application and the variable capacity application can operate with an SDN controller that communicates with the network. The SDN controller can be configured to implement changes in the optical layer and the packet layer, and wherein link metrics are set to protect packets in flight prior to any changes at the optical layer. Adjustments in the packet layer from the SDN IP application can include utilizing non-standard Ethernet rates. The non-standard Ethernet rates can be set by setting a shaper on a router interface to match an optical line rate.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for coordinated Internet Protocol (IP)/Multiprotocol Label Switching (MPLS) and optical capacity engineering and maximizing non-channelized router port capacity. Of note, the present disclosure contemplates an IMP approach to change capacity of a non-channelized router port and an approach with channelized ports.

Optical and IP Network

Figure 1:
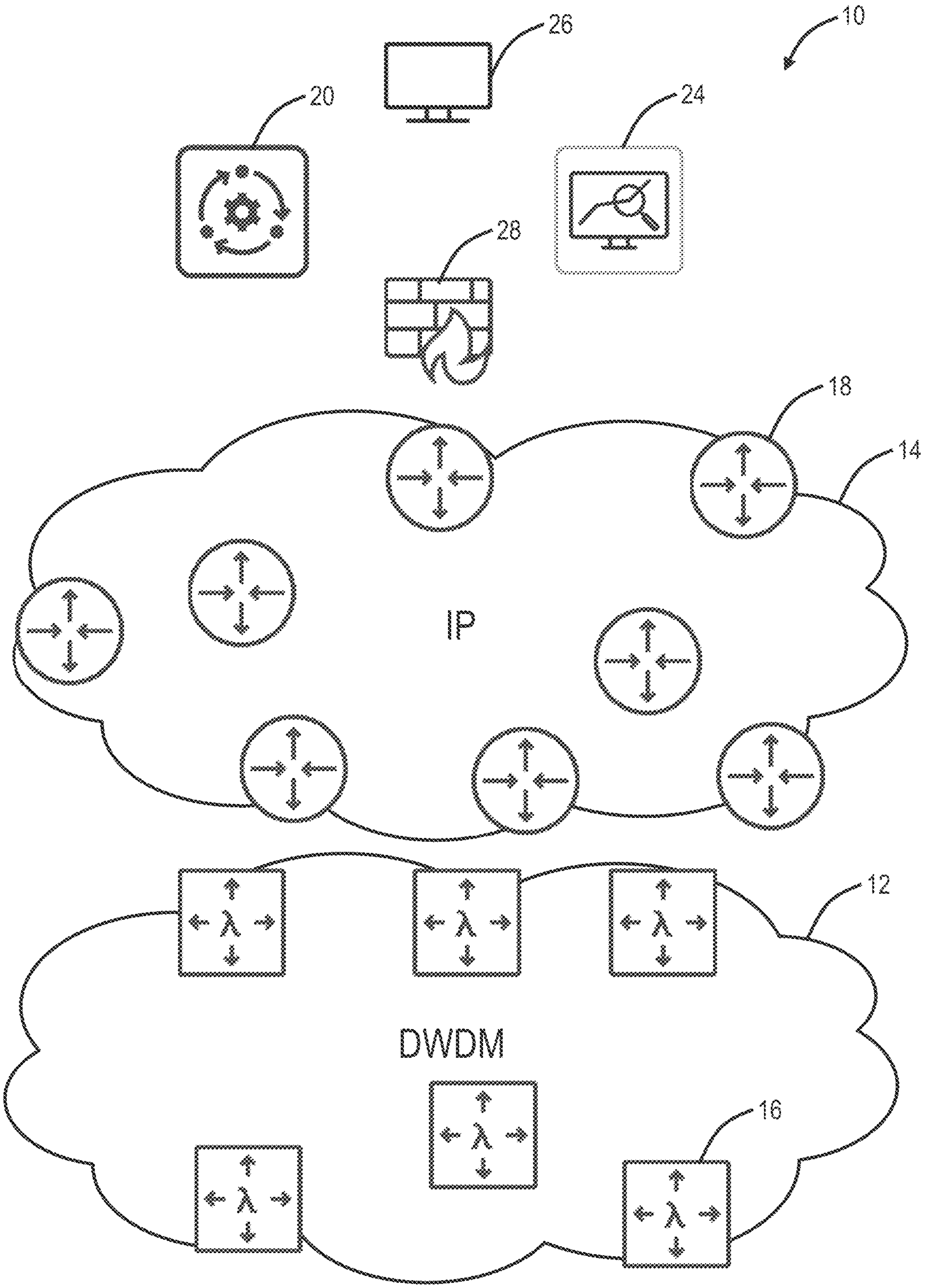
FIG. 1 is a network diagram of a network illustrating an optical layer and an IP layer.

FIG. 1 is a network diagram of a network 10 illustrating an optical layer 12 and a packet layer 14 (or simply a packet layer utilizing various protocols). The optical layer 12 can include network elements 16 such as Dense WDM (DWDM) network elements, Layer 1 Time Division Multiplexing (TDM) network elements, Packet-Optical switches, etc. The optical layer 12 includes Layer 0 (DWDM) and Layer 1 (TDM) connectivity. The optical layer 12 can also include just Layer 0 (DWDM, with Layer 1 omitted, e.g., direct packet-optical). The packet 14 layer can include network elements 18 such as packet switches, routers, etc. forming connectivity at Layers 2, 3, etc. Again, while referred to as an packet layer, the packet layer 14 can include Ethernet, MPLS, Segment Routing, etc., i.e., various other data protocols. Also, as described herein, the packet layer 14 can be referred to as an IP layer, but those skilled in the art will recognize there can be Ethernet, MPLS, Segment Routing, etc. between the IP layer and the optical layer 12. For example, IP services can be configured over Ethernet ports on the network elements 18. The network 10 also includes a DWDM Network Management System (NMS) 20, a router management system 22, back-office systems, an SDN controller 24, etc., that connect to the network elements 14, 16, routers, etc. through a firewall 28.

The network 10 is presented for illustration purposes and those skilled in the art will recognize various configurations, layers, protocols, etc. are contemplated herewith. Generally, the present disclosure relates to coordination of the two layers 12, 14 to enable packet support for variable optical capacity.

Variable Optical Capacity

Figure 2:
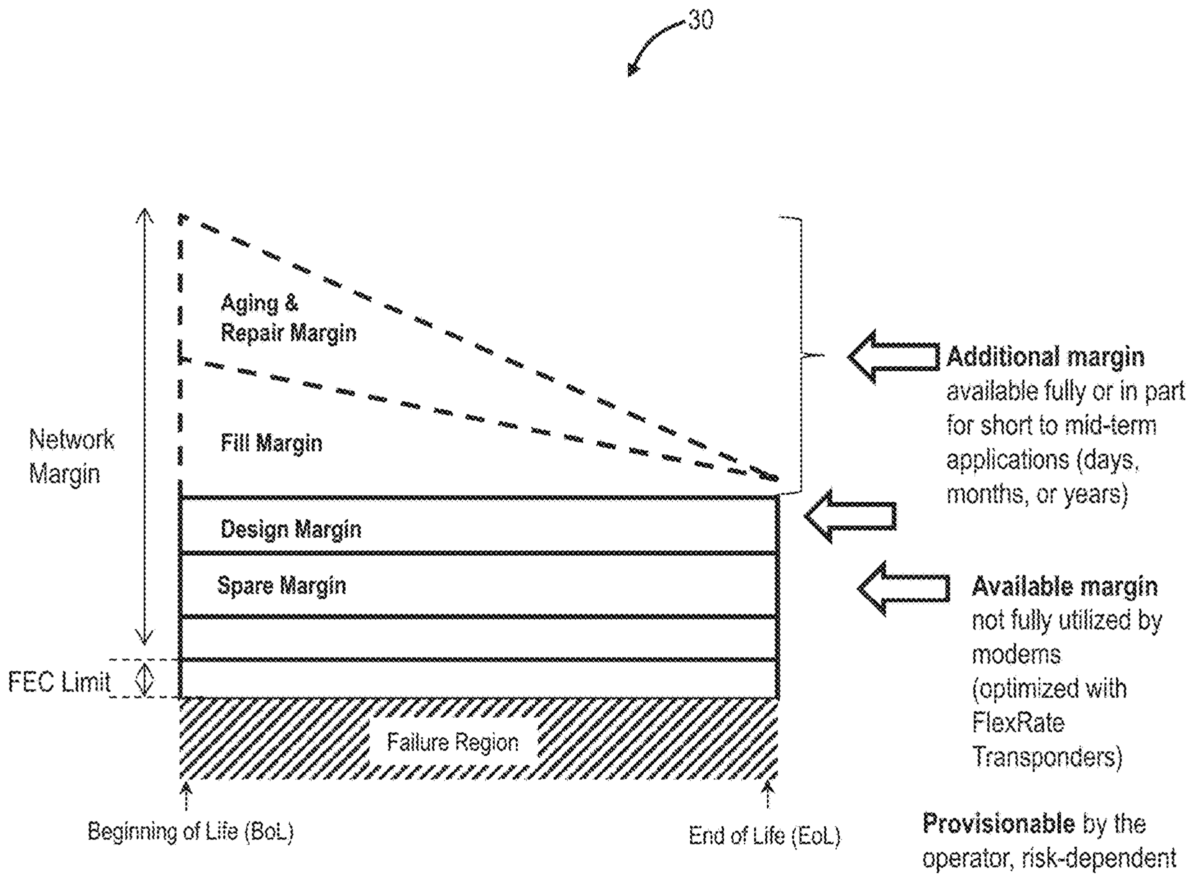
FIG. 2 is a diagram illustrating variable capacity at the optical layer based on system margin.

FIG. 2 is a diagram illustrating variable capacity in a graph 30 at the optical layer 12 based on system margin. The variable capacity is illustrated as the graph 30 of margin (y-axis) versus time (x-axis). The graph 30 shows a failure region, below where Forward Error Correction (FEC) can no longer correct, i.e., the FEC limit. Above the FEC limit are various margin areas which start at the Beginning of Life (BoL) with excess margin. By using programmable hardware, real-time telemetry of photonic and channel-margin statistics such as signal-to-noise ratios, and sophisticated software, it is possible to increase the capacities of the optical services. It can do this either permanently or for short/medium term by borrowing from the channel margin. Prior to variable capacity, signal capacity is offline planned using very pessimistic assumptions. The variable capacity replaces these assumptions with real-time measurement from the network. Again, one approach for variable capacity is described in commonly-assigned U.S. Pat. No. 10,148,384.

The optical layer 12 includes various margin for aging/repair, fill (single channels versus full fill of channels), design, spare, and operator safety margin. That is, there is significant margin in a typical optical line system (in the optical layer 12), and this can be used temporarily or permanently as needed.

Figure 3:
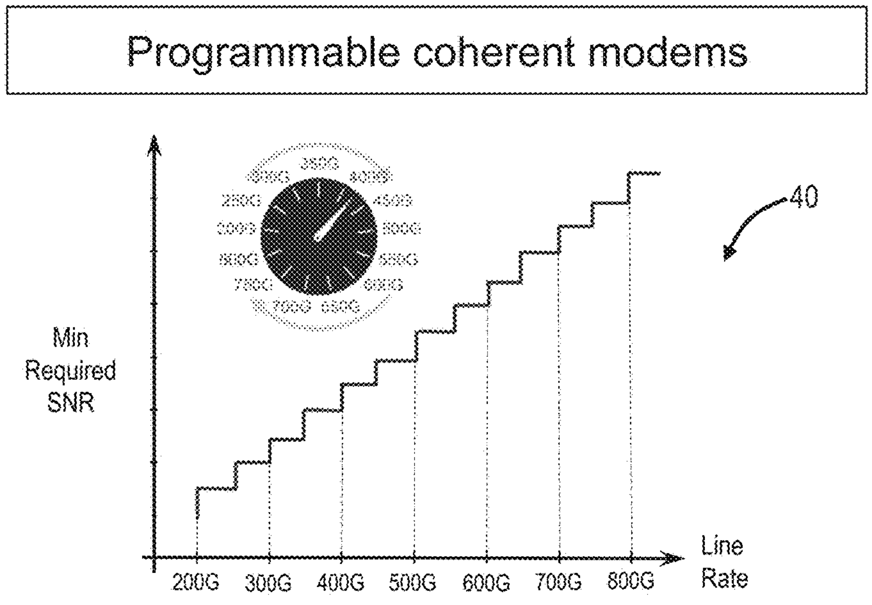
FIG. 3 is a diagram of analytics to enable optimized capacity with programmable optics.
Figure 3:
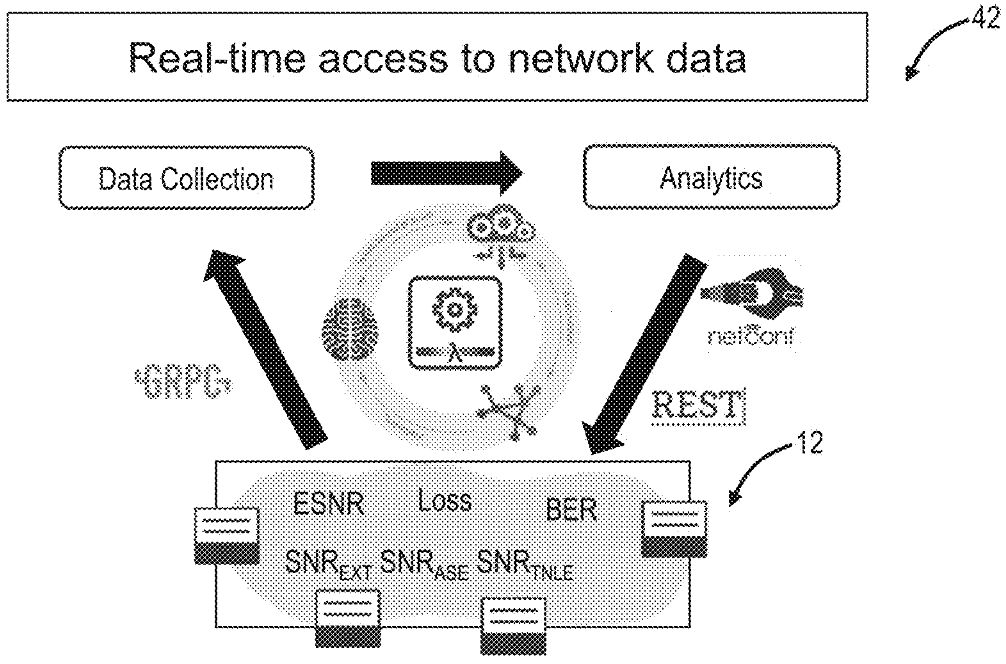

FIG. 3 is a diagram of analytics to enable optimized capacity with programmable optics. For example, a coherent optical modem can operate between 200G and 800G as illustrated in a graph 40, and there is a need for access to network data for various parameters such as Signal-to-Noise Ratio (SNR), Electrical SNR (ESNR), Loss, Bit Error Rate (BER), etc, as illustrated in a flow diagram 42. The flow diagram illustrates various data communication techniques between the optical layer 12, a data collection layer, such as via the DWDM NMS 20, and an analytics layer such as via the SDN controller 24. There can be an application that identifies which optical services can be upgraded to higher capacity (and the ones that should be downgraded). This is described in detail herein and is referred to as an SDN Channel Margin Gauge application 122 ("app").

Figure 4:
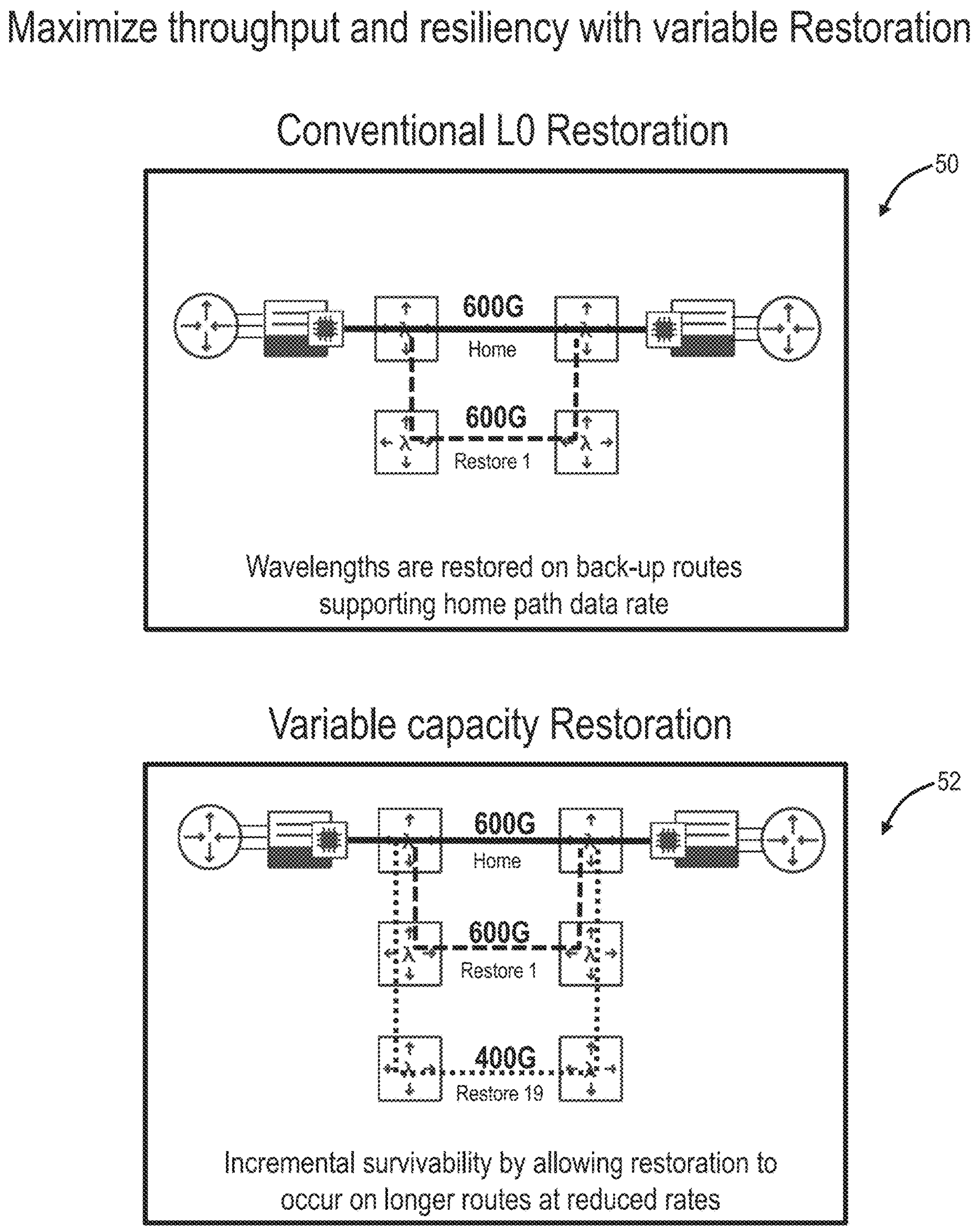
FIG. 4 is a diagram of a network illustrating conventional Layer 0 (L0) restoration compared to restoration with variable capacity.

FIG. 4 is a diagram of a network illustrating conventional Layer 0 (L0) restoration 50 compared to restoration 52 with variable capacity. Conventional L0 restoration 50 requires the restoration path in the optical layer 12 equal the home path in terms of capacity, e.g., 600G home requires 600G restoration. Note, as described in FIG. 4, 600G means 600 Gbps and the like. After a fiber cut or other fault in the optical layer 12, it may not always be possible to restore all the services that were going over that fiber at the same capacity as the original home path. This is because the optical restoration paths are typically longer, and longer paths imply higher signal noise and less capacity support. If a service cannot be restored at full-capacity, it may be possible to use variable capacity techniques and restore the service at reduced capacity. For example, a 400 Gbps service may be restored to a longer path at 300 Gbps. This is referred to as partial-capacity restoration 52. This approach enables additional restoration routes with lower capacities. Of course, having to restore every service at the full rate may lead to blocking where it is not possible to restore all services. The partial capacity restoration 52 enables restoration, such as on a longer route, but at a reduced capacity.

Note that some optical services are links at the IP layer. That is, one IP link spans multiple optical spans as a service. Fiber cut on any of these optical links will bring the IP link down.

Problem Statement

Consider an IP link with capacity 400 Gbps that is being utilized at 240 Gbps at the time of a fiber cut (IP links are not always fully utilized due to packet switching). Assume that the full-capacity restoration at 400 Gbps is not possible. The partial-capacity restoration is achievable at 200 Gbps. Without the approach described herein, if the IP link was brought up at 200 Gbps, the IP network would continue to send 240 Gbps traffic on this link. But because the link now has only 200 Gbps capacity, this would cause 40 Gbps of the traffic to be dropped. The fix is more than just a matter of changing the link capacity at the IP layer. Indeed, the IP layer does not (by default) use the link capacity in its routing decisions. This is a matter of re-optimizing the network to send less traffic to this link, not just the parameters of the link impacted.

Figure 5:
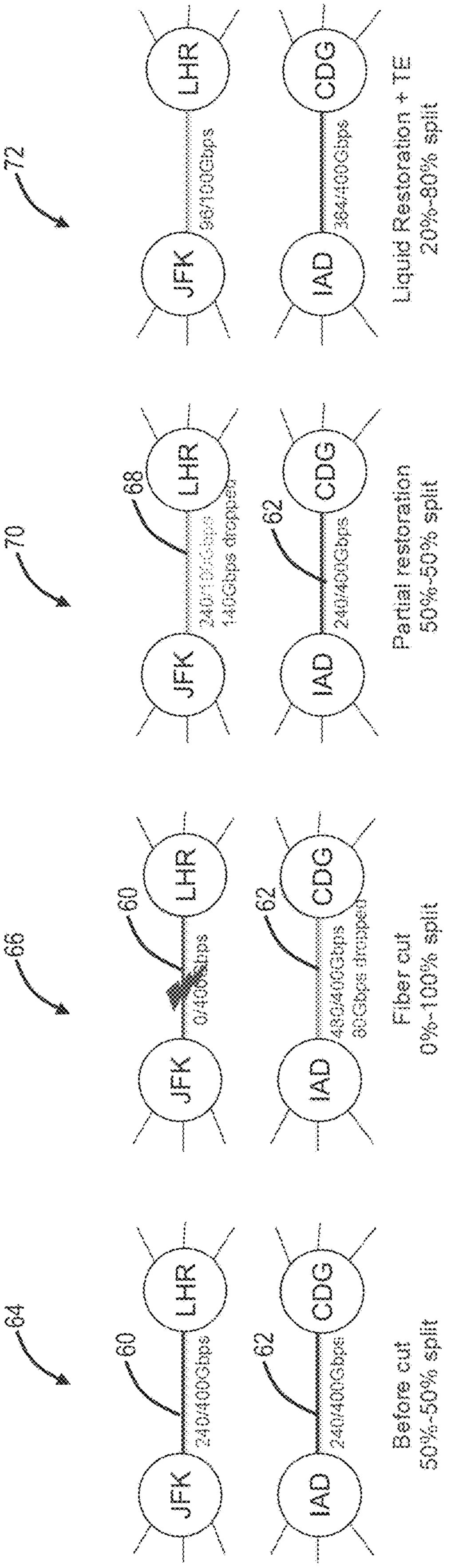
FIG. 5 is a diagram of IP links with different restoration approaches.

To further illustrate, let's assume there are 2 IP links 60, 62 between North America and Europe, New York to London (link 60), and Dulles to Paris (link 62), as illustrated in FIG. 5. Let's assume both links are 400 Gbps capacity and carrying 240 Gbps traffic at the time of a fiber cut impacting the NY link (step 64). After the failure of the link 60 (step 66), all 480 Gbps of the traffic will be routed at the IP layer to the Dulles link. Since the Dulles link has 400 Gbps capacity, 80 Gbps of the traffic will be dropped (step 66).

Let's assume at the optical layer that the NY link goes via Reykjavik to London and fiber is cut after Reykjavik and there is another optical path from Reykjavik to London that goes via Oslo, Hamburg, and Amsterdam (link 68). Unfortunately, the new path is very long and can only support 100 Gbps rate. The NY link can now be restored at 100 Gbps. Hence, the total capacity between NA and Europe increases to 500 Gbps from 400 Gbps. Since the total traffic is 480 Gbps, the IP network should be fine. But this is not the case.

If the IP link is brought up, IP routing will converge and continuing to split the traffic 50-50 between the two links. Hence, it will forward 240 Gbps traffic on the NY link. Since the new capacity is only 100 Gbps, the NY link will drop 140 Gbps of traffic (step 70). This is actually worse than not doing variable (partial) restoration at all which dropped only 80 Gbps (step 70).

One can argue that all has to be done is to decrease the capacity of the link. But that is not sufficient with both default Interior Gateway Protocol (IGP) routing and segment routing. Resource Reservation Protocol-Traffic Engineering (RSVP-TE) would do better as it pays attention to the capacity, but even that will suffer as what is needed here is global network optimization (RSVP-TE does greedy device optimization) and split the traffic 20-80 instead of 50-50. This is the job of a traffic engineering app (step 72).

The present disclosure is applicable anytime the optical network changes the capacity of an IP link (the optical service), whether the capacity is decreased like our example (e.g., using a variable capacity Restoration App) or increased (e.g., using Channel Margin Gauge App). The latter is useful when the IP network becomes congested without a fiber cut. This can happen due to sudden traffic shifts (e.g., new software release, etc). In these cases, it would be desirable to increase capacity of some of the IP links even if that is only possible for short-term. A variable Channel Margin Gauge App can do this. To get the desired impact after the capacity increase, traffic engineering needs to be run.

Standard Ethernet Rates

Figures 6, 7:
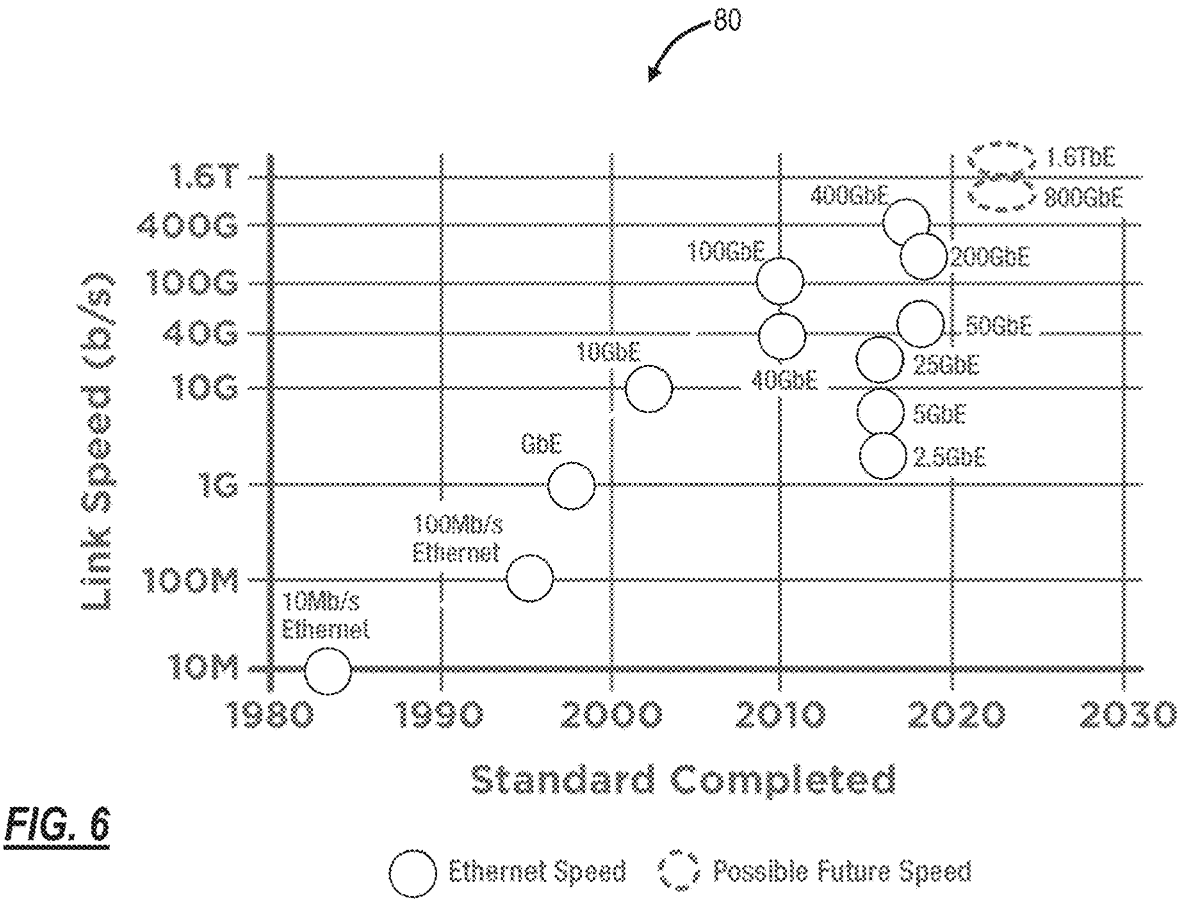
FIG. 6 is a graph of standard Ethernet rates.
FIG. 7 is a table of 400ZR and OpenZR+ specifications.

FIG. 6 is a graph 80 of standard Ethernet rates. Note, there is a lot less granularity than the programmable optical rates in FIG. 3. That is, granularity in Ethernet is 100 GbE, 200 GbE, 400 GbE, and future 800 GbE, 1.6 TbE. As shown in FIG. 3, the programmable optical rates are illustrated in granularity of 50G. Also, the programmable optical rates can be even more granular than 50G increments.

FIG. 7 is a table 82 of 400ZR and OpenZR+ specifications to show the optical reach.

Disparity Between Ethernet Rates and Optical Rates

Figure 8:
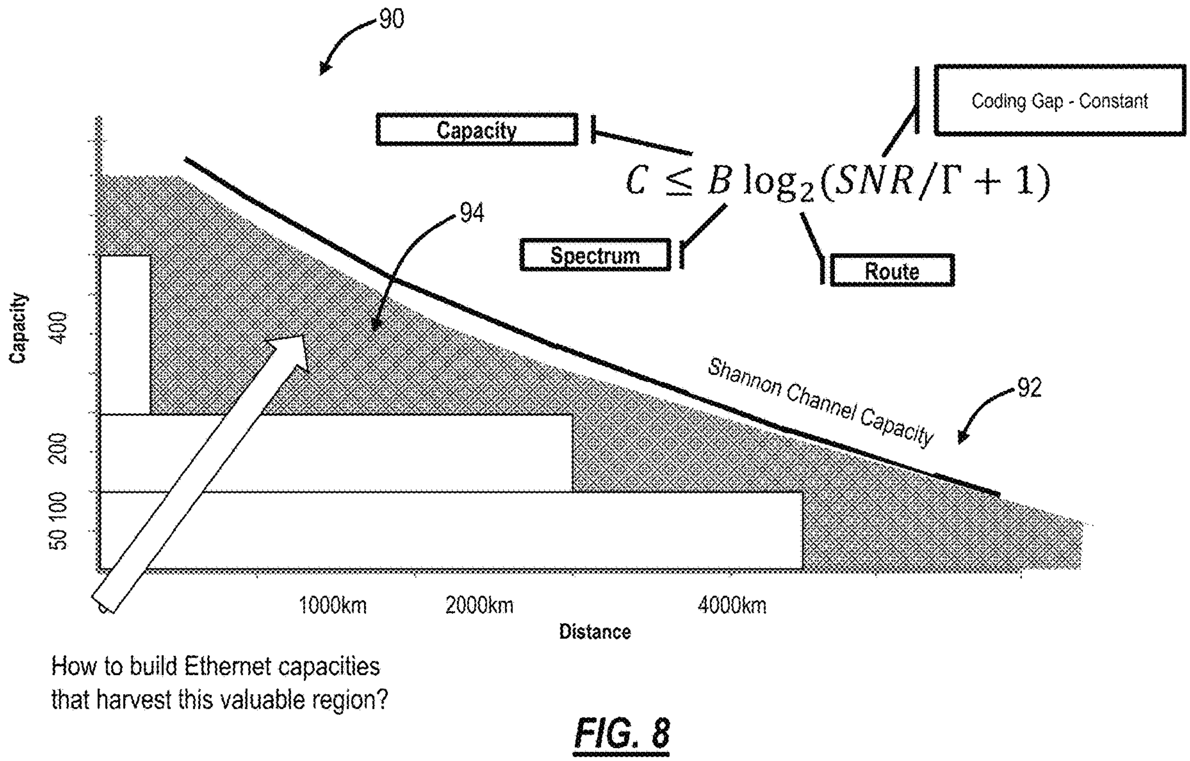
FIG. 8 is a graph of optical and Ethernet capacity versus distance relative to the Shannon channel capacity.

FIG. 8 is a graph 90 of optical and Ethernet capacity versus distance relative to a Shannon channel capacity 92. This illustrates the disparity between Ethernet rates and the programmable optics rates. The present disclosure presents approaches to harvest a dark region 94 that is not serviceable today by Ethernet. Of note, distance matters and there is a desire to use the best optical line capacity provided by the optics and to make that the best capacity router link that a router can use in a cost-effective manner.

There are some ways to create Ethernet ports at different rates, assuming standardization. For example, it is possible to use Interlaken between the Ethernet switch and the coherent port. This is an excellent standard interface, but it is an older interface; suppliers are not implementing in newer Ethernet devices. It is also possible to use Flexible Ethernet (FlexE) which is an emerging standard, but does have density penalties, making it undesirable.

It is also possible to reuse the standard Ethernet rates. This can channelize the Ethernet port. For example, turn 400GE into 2×200GE, 4×100GE, or 8×50GE, or create a mixed interface, such as 1×200GE+1×100GE+2×50GE. Here, when capacity is not available at the optical layer, turn specific interfaces off. One downside with channelization is a single port provides the best statistical multiplexing.

Another possible to is cause a standard port to have lower throughput. Ethernet frames contain the data therefore limit the data frames. Options to limit the effective data rate on an Ethernet port—

1) Do nothing. Throw away (tail-end drop) frames that arrive too quickly. Very undesirable.
2) Increase the interpacket gap (IPG). Do you know the average frame size? Increase IPG to get the desired decrease the throughput. Consecutive large frames (>average size) will cause an overrun.
3) Shape the output port flow. Use the Ethernet switch to apply flow back pressure towards the interface so that a maximum throughput is not exceeded. A modern VoQ Ethernet switch can do this accurately with very little burst error.

Of note, the present disclosure contemplates any of these approaches.

Considerations

Consider a router network that is interconnected with a dynamic and flexible line rate coherent optical infrastructure. The following points are noted herein:

Recognize that the optical line capacity will vary with distance. (Shannon, information transmission theory).

Recognize that modern transceivers (modems) support a variety of capacities (e.g., 400G, 350G, 300G, 250G, 200G, 150G, 100G).

Recognize that some transceivers can be configured to support idle mapping procedure (IMP).

Recognize that all commercial routing ASICs implement interfaces that support standard Ethernet rate (100GE, 200GE, 400GE).

Recognize that a single port interface may be preferred over channelized interfaces.

Recognize that commercial routing ASICs can shape packets into an interface.

Recognize that interlayer (transitional) links are discoverable/known.

Example Optical—IP Capacity Interworking

First, determine optical transmission rate and configure optical line appropriately. For example, Optical Transport Unit level C3-60 (OTUC3-60) for a single 300GE worth of Ethernet frames. Set the router ASIC interface higher than desired by the optical modem (e.g., 400GE). Set the modem's client interface to 400GE but change from bit mode to frame mode (IMP). IMP=Idle Mapping Procedure—Operates like Generic Framing Protocol-Frame mode (GFP-F). Set the shaper on that interface to match the line rate (300GE).

How this works—

A) The router passes valid frames @ 300G shaped and idles to the modem client.
B) The modem passes the valid frames to the line and discards everything else (idles, . . . ).

Data Path and Optical Path

Figure 9:
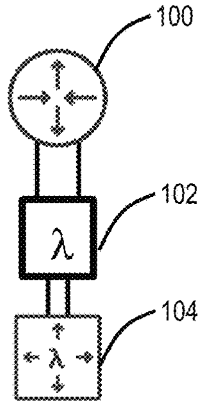
FIG. 9 is a diagram of connectivity between the data path and the optical path.

FIG. 9 is a diagram of connectivity between the data path and the optical path. This includes an Ethernet Switch/Router 100, interconnected to a modem 102 (e.g., 400GE), Optical line fiber, and ROADM 104.

Figure 10:
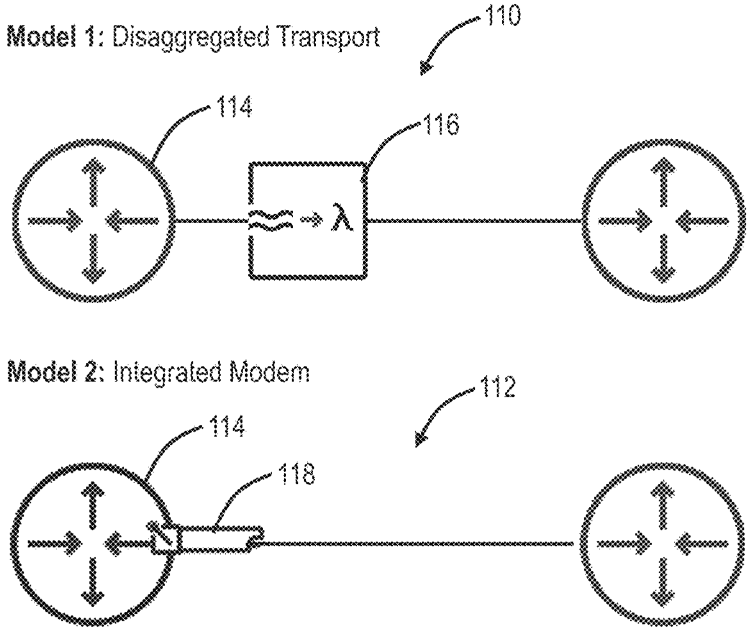
FIG. 10 is a diagram of DWDM integration between the router and the modem.

FIG. 10 is a diagram of DWDM integration between the router and the modem. There are two general models 110, 112—disaggregated 110 where a router 114 connects to a transport network element with a transponder 116, e.g., via short reach interfaces (grey), and integrated 112 where there are coherent pluggable optics 118 in the router 114. In the disaggregated model 110, the router 114 can have "grey" or non-DWDM optics to the transponder 116. In the integrated model 112, the router 113 can have variable rate pluggable optical modems, e.g., QSFP-DD, CFP2-DCO, etc.

Of note, there is a need for the router 114 to know the capacity of the modem (i.e., the transponder 116, the optics 118) and vice versa. Options can include manual provisioning and discovery. Discovery can include snooping such as via Link Layer Discover Protocol (LLDP) as well as communication via a management plane (SDN controller, NMS, etc.).

There is a need to understand the optical path-Discover the modem to photonic system interconnect and Discover the A-Z optical path, Compute/discover the maximum link capacity for the optical path, Discover the router to modem interconnect (needed for the disaggregated solution), and adjust the routers port and link. This adjustment can include aligning the port shaper to the optical line rate, adjusting the IGP link metric (for Constrained Shortest Path First (CSPF) to prevent congestion, and/or adjusting Segment Routing (SR) TE policy objects to avoid congestion and packet drops.

We need to know the inter-layer hand-off. There are 2 inter-layer handoffs; router to modem client interface and optical line interface to ROADM client interface port. This is the case regardless of whether the solution is integrated or disaggregated; both interfaces are still of interest and it's just that in the integrated solution, where the coherent optics are plugged into the router, that there was a fixed one to one relationship from the internal router packet interface to the modem client interface and there is nothing to discover.

For interlayer adjacency, the following provides some options 1. router port to transponder client interface.
   a. Manually provisioned
   b. Message snooping (e.g., LLDP-snooping) of messages transmitted by the router onto the modem client interface
   c. System to collect and correlate the snooped/gathered information against the transmitted information.
2. Transponder line interface to optical channel multiplexing/demultiplexing interface
   a. Manually provisioned
   b. Manually provisioned and verified (optical loopback scheme) with coordination of the modem c. Scheme involving the modulation of the optical carrier that is discernible by the optical mux or demux HW (VOA, OSA)
   i. Attenuation (on-off keying, typically out of service)
   ii. Peak-power dithering
   iii. Tx-shaper dithering (varies the spectral width of the signal)
d. System to collect and correlate the recorded information against the transmitted information.
e. May not be need in the case with the optical line interface is 1:1 with the channel mux/demux interface (e.g., an integrated assembly)

Figure 11:
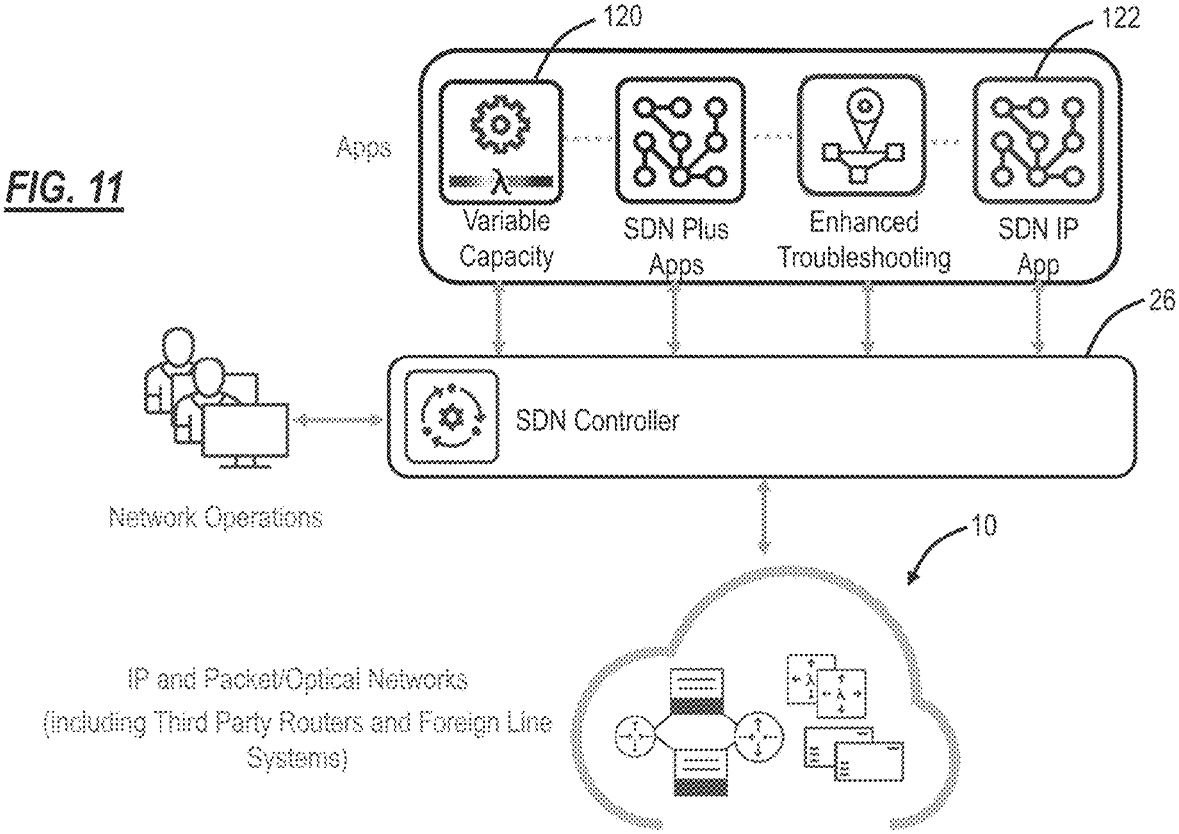
FIG. 11 is a diagram of an SDN controller and applications for interworking the optical and Ethernet/IP/MPLS layers.

FIG. 11 is a diagram of an SDN controller 26 and applications 120, 122 for interworking the optical and Ethernet/IP/MPLS layers 12, 14. The SDN controller 26 can manage optical paths-plan the optical path, provision the optical path, monitor the optical path, reroute the optical path, discover and manage legacy optical paths, etc.

The SDN controller 26 can also include a variable capacity application 120 (see U.S. Pat. No. 10,148,384). The variable capacity application 120 can provide optical path engineering, guaranteed optical path viability, forecast tolerant, end-of-life, etc. The variable capacity application 120 can also provide analytics, including visualizations such as a channel margin gauge, photonic performance gauge, etc. The variable capacity application 120 can also determine actual optical path viability by receiving/pulling metrics from the network, computing excess margin (Channel margin gauge), etc. and can recommend capacity upgrade and/or reach. This allows for additional optical path options. The variable capacity application 120 can also provide estimated optical path viability based on live network conditions.

The SDN controller can also prepare for automatic restoration. For example, a Layer 0 Control Plane (L0CP) can include preprogrammed restoration paths including optical line rate.

The SDN controller can work with an SDN IP application 122 that is used to update router ports and links, align the port shaper to the optical line rate, adjust IGP link metrics to prevent congestion, and adjust SR TE policy objects or RSVP-TE tunnels to avoid congestion and packet drops.

The last piece of the puzzle is setting router port shaper, correctly adjusting IGP link metric(s) and any RSVP-TE and/or SR TE policy control.

Link Activation—Add a Non-Standard Rate Ethernet Interface to the Network

This can provide additional capacity to enable services or optimize the network. The SDN controller 26 can recommends modem options to achieve capacity targets. The SDN controller 26 can activate photonic services meeting deployment constraints and optimization criteria. The variable capacity application 120 can compute optional alternate paths and programs L0 control plane fault response, Path, modulation rate, wavelength, Ethernet IMP client. The SDN IP application 122 can receive a notification or pre-notification of L0 link activation, and creates necessary router port provisioning constructs (port, link, IP interface, . . . ), align the port shaper to the optical line rate, set IGP cost metrics.

The router port becomes operational and link initialization begins. A new link notification can trigger the SDN IP application 122 to optimize the network including SR TE policy updates where needed.

To activate a router link that is using a non-standard-sized Ethernet interface rate:

- Get interlayer relationship between the router port and the optical line.
- Compute optical viability for various possible paths. (Optical path and optical capacity)
- Select and activate a wavelength service that meets deployment constraints and optimization criteria.
  - Configure the optical modem-modulation rate, frequency, . . . .
  - Set the client interface to support IMP.
  - Configure the various photonic devices in the DWDM to support and activate the optical path.
- Notify the router control application of L0 service activation.
  - Creates necessary router ports provisioning constructs (port, link, IP interface, . . . )
  - Align the port shapers to the optical line rate
  - Set IGP cost metrics. Use the shaper rate, not the port interface rate
- Router port becomes operational & link initialization begins.
- New link notification triggers router control application to optimize the network including SR TE policy updates where needed.

Reaction to a Fault in the Network. Restore a Link and Add Capacity Back into the Network.

The modem can detect a failure and condition a fault towards the router port. The router receives and reacts to in-band port down conditioning event (Local Fault/Remote Fault—LF/RF). IGP updates and the router activates TI-LFA followed by PCE-based optimization. A L0 Control Plane removes faulted wavelength from the photonic network and begins restoration (per plan) to select and signal optical path and program modems (wavelength, modulation rate, Ethernet IMP client . . . ).

The SDN IP application 122 receives notification of L0 link restoration in progress, aligns the port shaper to the optical line rate and increases IGP cost metric (for CSPF) to prevent congestion. The modem achieves continuity and removes fault conditioning. The router port becomes operational and IGP link initialization begins (latency, shared risk link groups (SRLGs)). A Link up notification can trigger the SDN IP application 122 to deploy optimized SR TE policies to enable use of recovered link while ensuring new bandwidth does not cause congestion and packet drops (prevents hyper aggregation). Of note, a L0CP may not be required, as these actions could be via the SDN controller, an NMS, or even user commands.

To Restore a router link that is using a non-standard-sized Ethernet interface rate:

- Modem detects failure and conditions a fault towards the router port.
- Router receives and reacts to in-band port down conditioning event (LF/RF)
- IGP updated and router activates TI-LFA followed by PCE-based optimization.
- An entity (control plane, NMS, SDN application, user) removes the wavelength service from the network.
- Follow the "Activate a router link that is using a non-standard-sized Ethernet interface rate" procedure (See previous section above.)
- If the router link has downsized, then it is critical that the SR TE policies or RSVP-TE tunnels get updated and deployed to reflect the new capacity in order to prevent congestion/hyper aggregation.

Link Reversion to Network Ideal Path

The L0 control plane (L0CP)/SDN controller 26 can identify better optical paths. The SDN IP application 122 can be permitted to drain traffic from link. (User intervention or policy), by increasing IGP cost metric to discourage link usage and/or by deploying SR TE policies (or RSVP-TE tunnels) to discourage link usage.

The SDN IP application 122 can initiate a L0 path update after a dampening timer expires. The L0CP or SDN controller 26 can remove the restoration wavelength from the photonic network, the modem conditions a fault towards the router port, the router receives and reacts to in-band port down conditioning event (LF/RF), and IGP updates and the router activates TI-LFA followed by PCE-based optimization.

The L0CP or SDN controller can select and activate the new path. The SDN IP application 122 can receive notification of link restoration in progress, align the port shaper to the optical line rate, and set the IGP cost metrics appropriately. The modem achieves continuity and removes fault conditioning. The router port becomes operational and IGP link initialization begins. The SDN IP application 122 can deploy SR TE policies (or RSVP-TE tunnels) to optimize use of link.

To revert a router link that is using a non-standard-sized Ethernet interface rate:

- Entity (user, control plane, SDN application) determines a better optical path for the router link.
- Router control application permitted to drain traffic from link.
  - Increase IGP cost metric (for CSPF) to discourage link usage.
  - Deploys SR TE policies (or RSVP-TE tunnels) to discourage link usage.
- Router control application signals/initiates L0 path update after dampening timer expires.
- An entity (control plane, NMS, SDN application, user) removes the wavelength service from the network.
- Follow the "Activate a router link that is using a non-standard-sized Ethernet interface rate" procedure using the desired path (See two sections above.)

SDN IP Application

Figure 12:
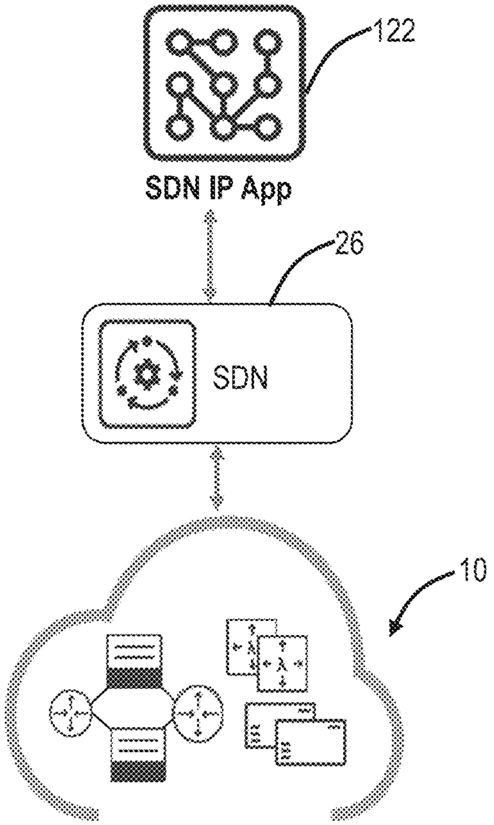
FIG. 12 is a diagram of an SDN IP application architecture.

FIG. 12 is a diagram of an SDN IP application 122 architecture. The SDN IP application 122 communicates with the network 10 through the SDN controller 26. In various embodiments, the SDN IP application 122 supports Layer 3 topology and routing discovery, such as with Border Gateway Protocol Link State (BGP-LS), Intermediate System-Intermediate System (ISIS), Open Shortest Path First (OSPF). Multiprotocol BGP (MP-BGP) (IPv4, IPV6, VPNs, . . . ), Path Computation Element Communication Protocol (PCEP), NetConf/YANG, CLI, etc.

The SDN controller 26 can provide traffic and performance telemetry, such as via Streaming Generic Remote Protocol Call (GRPC)/GRPC Network Management Interface (GNMI), Netflow/IP Flow Information Export (IPFIX), Simple Network Management Protocol (SNMP), etc. The SDN controller 26 can provision the network 10 such as via PCEP, NetConf/YANG, etc.

Figure 13:
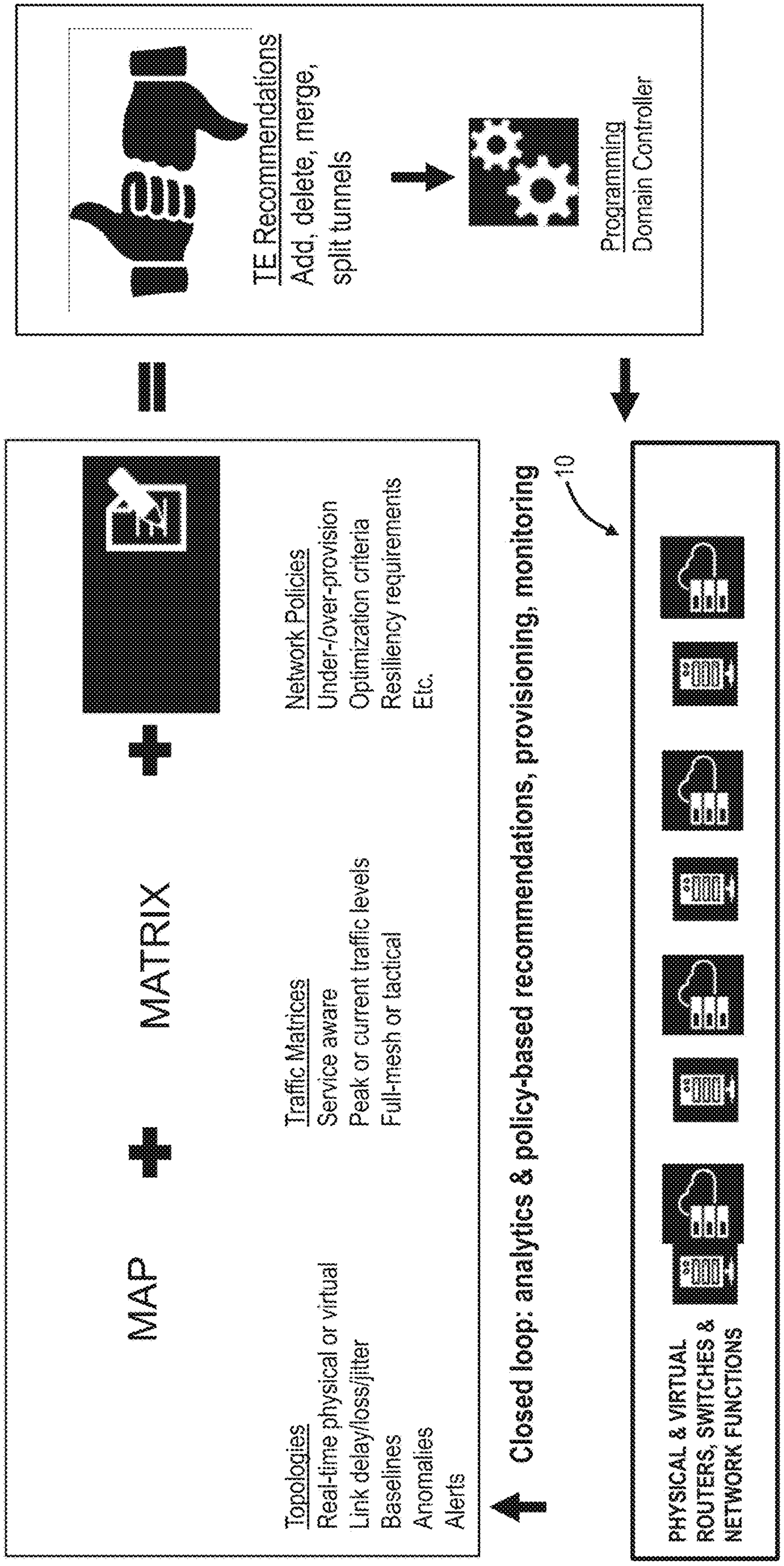
FIG. 13 is a diagram, of workflow for the SDN IP application architecture.

FIG. 13 is a diagram, of workflow for the SDN IP application 122 architecture. The SDN IP application 122 provides a closed loop for analytics and policy-based recommendations, provisioning, monitoring. The SDN platform enables closed loop analytics and automation to create more agile networks. Instead of requiring offline planning that can take hours or days, the SDN IP application 122 computes in seconds the optimum traffic engineering configurations to achieve desired goals. The SDN IP application 122 receives topologies from the network 10, such as real-time physical and/or virtual components, link delay/loss/jitter, baselines, anomalies, alerts, etc. The SDN IP application 122 can receive and/or determine traffic matrices that are service aware, include peak or current traffic levels, are full mesh or tactical, etc. Finally, the SDN IP application 122 can include network policies, e.g., under/over provision, optimization criteria, resiliency requirements, etc. Finally, the SDN IP application 122 can analyze these components to provide traffic engineering (TE) recommendations, e.g., add, delete, merge, and/or split SR policy objects or RSVP-TE tunnels. The SDN IP application 122 can then program the network 10 accordingly.

Figure 14:
FIG. 14 is a screenshot of the SDN IP application for traffic engineering to reduce delay by reducing link congestion.

FIG. 14 is a screenshot of the SDN IP application 122 for traffic engineering to reduce delay by reducing link congestion.

Variable Capacity Application

Figure 15:
FIG. 15 is a diagram of a variable capacity application for optical links illustrating a Channel Margin Gauge showing a measure of excess optical margin.

FIG. 15 is a diagram of a variable capacity application 120 for optical links illustrating a Channel Margin Gauge. The variable capacity application 120 can work in tandem with the SDN IP application 122 to boost router link capacity.

Figure 16:
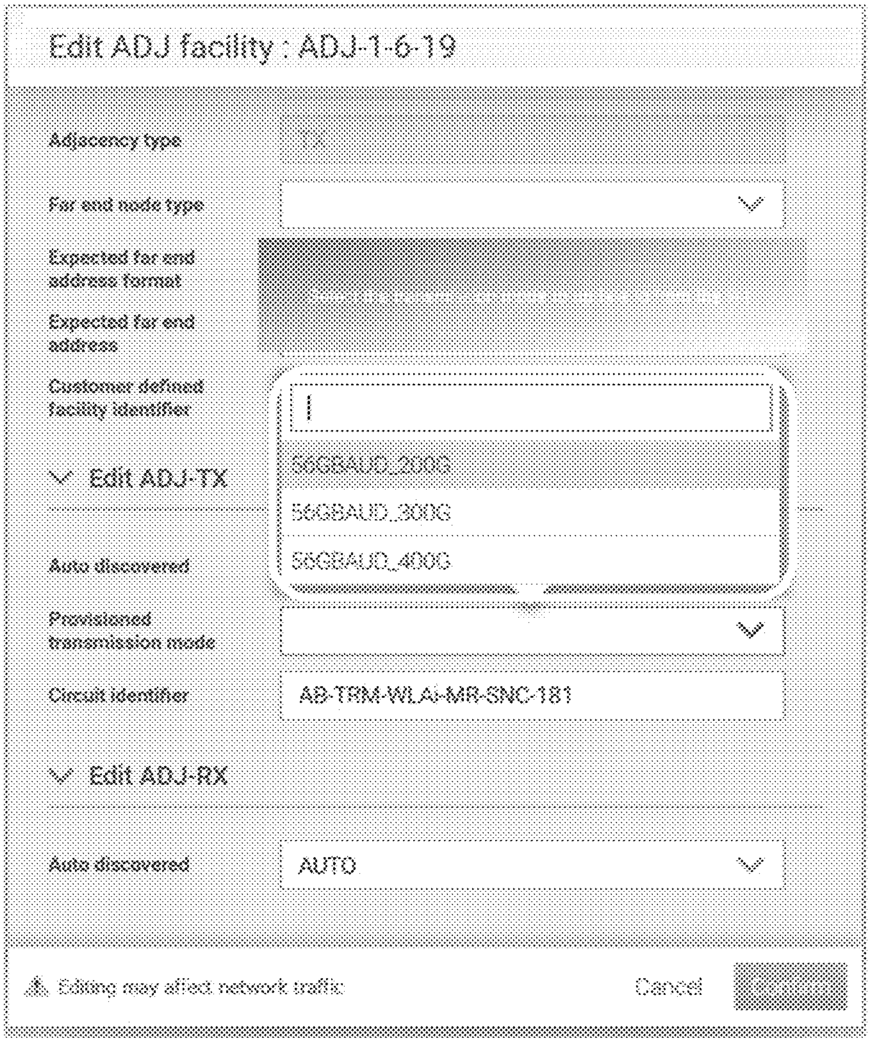
FIG. 16 is a screenshot of editing an adjacency in the variable capacity application.

FIG. 16 is a screenshot of editing an adjacency in the variable capacity application 120.

Figure 17:
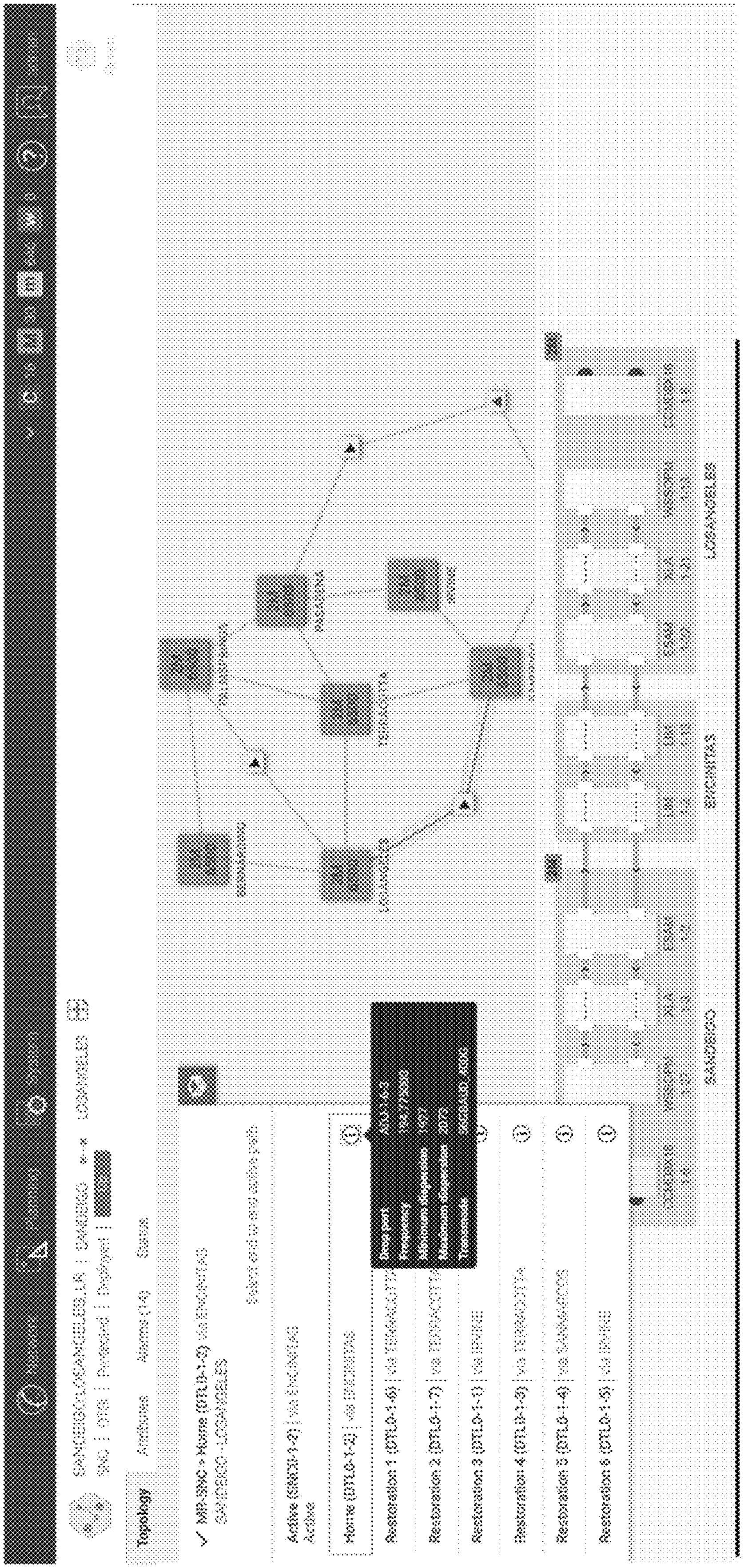
FIG. 17 is a screenshot of maximizing throughput on preferred path in the variable capacity application.
Figure 18:
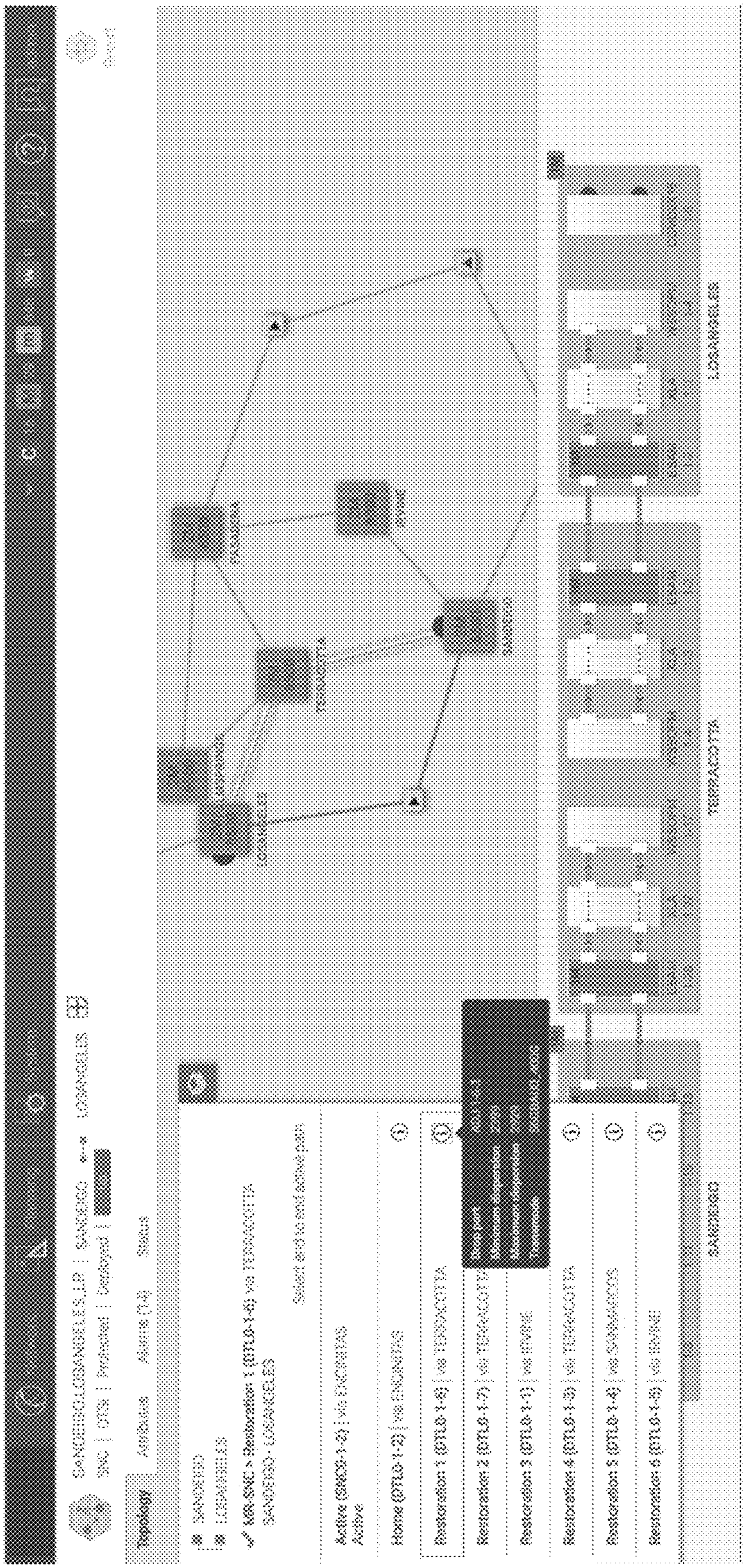
FIG. 18 is a screenshot of a first restoration path for preferred path in the variable capacity application.
Figure 19:
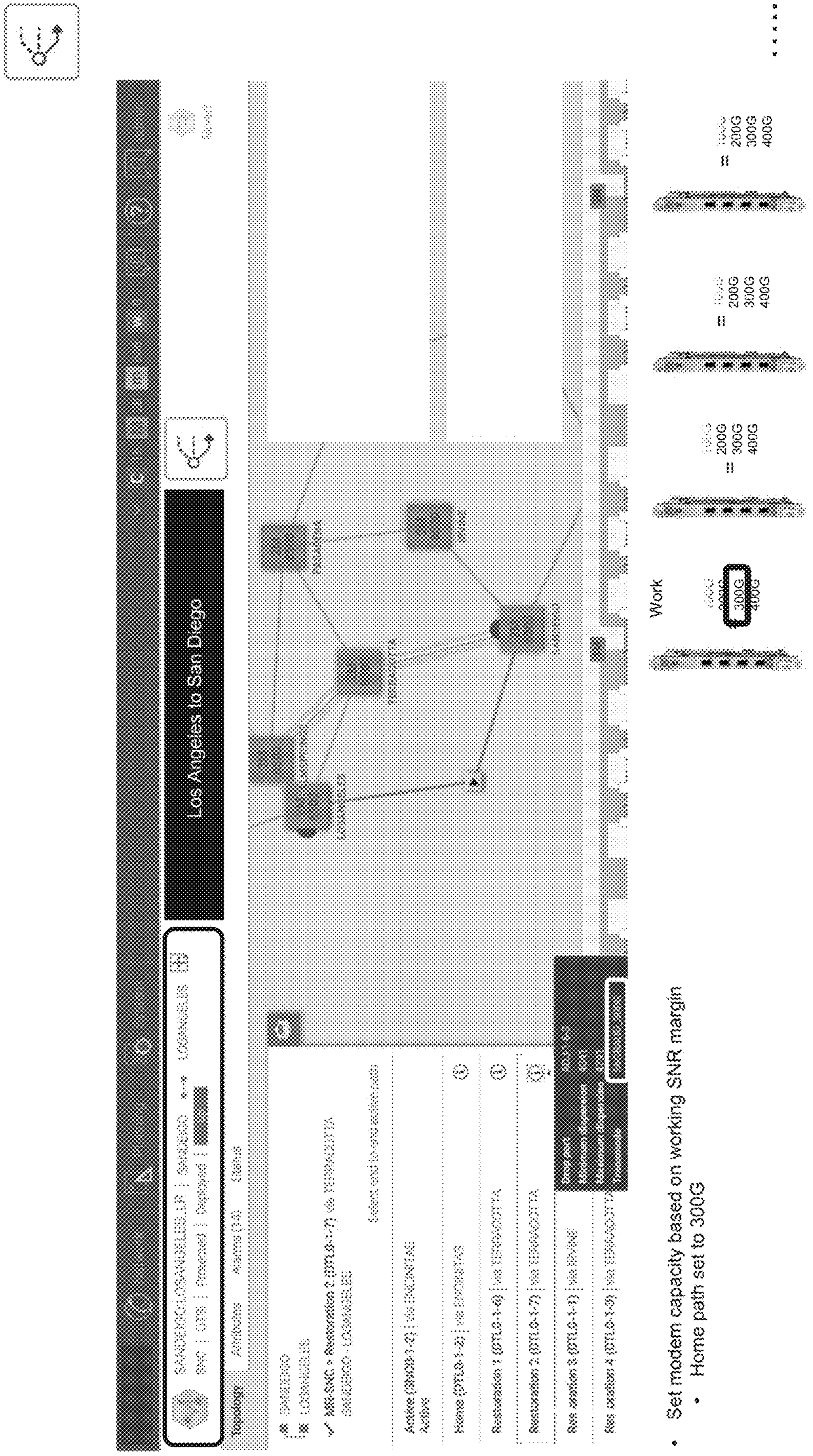
FIG. 19 is a screenshot of a second restoration path for preferred path in the variable capacity application.

FIG. 17 is a screenshot of maximizing throughput on preferred path in the variable capacity application 120. FIG. 18 is a screenshot of a first restoration path for preferred path in the variable capacity application 120. Here, the first restoration path is at the full capacity of the preferred path (e.g., 400G). FIG. 19 is a screenshot of a second restoration path for preferred path in the variable capacity application 120. Here, the first restoration path Is at a downshifted capacity of the preferred path (e.g., 300G). For example, the second restoration path may be longer or have more hops, requiring reduced capacity.

The variable capacity application 120 can provide insight into optical viability. This can include an understanding of the transmission fiber—it is seldom homogenous except in new network builds. Given the modem characteristics and the route traversed (including optical switching hops):

a. An educated computation using a small set of options expressed in optical capacity.
b. A calibrated computation with a specific end of life guarantee
c. a pre-existing test (pilot tone) that is used to determine the available margin on a per-wavelength BW rate basis (effective BW=BAUD×symbol rate-overhead)
d. A real time viability calculation that includes not only the route but the end-to-end noise loading and effectiveness of the specific modem pair.

The variable capacity application 120 can also provide a source-destination set of routes with an associated optical capacity as well as an ability to express this source-destination route set to a higher-level entity for advanced processing (need to link or topology rearrangement), such as for the SDN IP application 122.

The variable capacity application 120 can also include optical wavelength placement (i.e., Routing and Wavelength (or Spectrum) Assignments). This includes understanding the nodes and links that make up the photonic network, understanding the spectrum utilization on those links as well as any optical switching limitations that would limit the placement of a wavelength entering or passing through the network, understanding the photonic networks spectrum utilization-What is in use and what is available, etc. The variable capacity application 120, such as in conjunction with the SDN controller 26 or another management entity, has the ability to activate/deactivate a wavelength service on the photonic network.

SDN IP Application+Variable Capacity Application

The present disclosure relies on "what-if" (i.e., pre-planning) capabilities of the SDN IP application 122 which can compute what will happen in the network after partial restoration which then fed into another engine that optimizes the new conditions.

1) This method allows an expansive stepped range of flexible rate (optical) line speeds to functionally align with the more limited range of IEEE standardized Ethernet interface rates thereby maximizing router port (link) capacity. Router ASIC port rates follow the Ethernet standard rates which are less plentiful than the available coherent optical line rates. Therefore, there are lots of optical line operating regimes where unused capacity is available to be utilized.
2) This method enables the additional value that can be derived from the variable capacity application 120, both in restoration and connectivity reconfiguration in supporting un-channelized IEEE standardized router interfaces.

Example Process

1) Determine the source-destination optical path (over one or more spans) viability for a link supported by a port on two router interfaces.
2) Set the optical line interface rate to a viable rate (e.g., OTUC3-60 carrying 300GE).
3) Configure the router ASIC port-facing interface to the higher/highest standard Ethernet rate. (e.g., 400GE). Of note, we do not align the transceiver optical line interface rate to the ASIC interface rate.
4) Set the optical client interface to match the router ASIC port (e.g., 400GE).
5) Set the shaper on the router interface to that of the optical line rate, to prevent packet drops (e.g., 300GE). Put the optical client interface in IMP (Idle Mapping Procedure) mode. Switch from the default behavior of being bit-transparent to being frame-aware so we can rate adapt from the higher Ethernet interface rate (400GE) to the lower optical line rate (300G). We rely on precise and effective shaping combined with a small buffer on the optical client interface to prevent packet drops.
6) Configure the Interior Gateway Protocol's (IGP's) link capacity to be the shaper rate (optical line rate), not the port speed. Deploy SR TE policies to enable use of link thus ensuring bandwidth does not cause congestion and packet drops (prevents hyper aggregation).

Technology

The present disclosure utilizes a combination of some or all of the following technologies.

1. Variable rate modems that work at either Ethernet standard rates or use an idle mapping function and packet switch shaper capability that can be used to shape packets into the router link interface such that the rate of packets consumes or nearly consumes the Ethernet capacity provided by the (optical) interface.
2. An agile optical layer that can follow fiber topology to create router capacity services (router link capacity services aka wavelengths).
3. A method that allows for the understanding of link capacity provided by the (optical) port connectivity options and the associated capacity that each optical interface could be expected to produce. (Optical link viability). Also desirable is the ability to provide a summary list of a route and associated capacity; optical capacity may vary on a per frequency or frequency range basis.)
4. The ability to perform the routing and spectral assignment of a wavelength on the photonic network.
5. A method to learn about the inter layer adjacency between two different technologies. This includes a) router port to transponder client interface and b) transponder line interface to optical channel multiplexing/demultiplexing interface
6. An IGP that supports and advertises per link traffic engineering parameters.
7. (Optionally centralized) network topology and traffic engineering entity that is responsible for surveying, computing, setting, and distributing link TE metrics that allow the network to efficiently consume link capacity.
8. (Optionally centralized) service engineering interface that is aware of the source to destination demand and the rationale and relationship two other services in the network should there be any. This is needed in case service rearrangement is desired or service level agreement needs to be considered in the case of a service reroute (e.g., maximum latency constraint).

This combination provides a better, more effective, and more aligned Ethernet network to the optical layer.

Optical Modems

Of note, transceiver, transponder, optical client interfaces, etc. are all optical modems as described herein. The optical modems support variable rate.

In an embodiment, each modem can be tunable so that it can selectively generate a wavelength centered at a desired carrier wavelength (or frequency). In exemplary embodiments in which tunable modem are used, the wavelength range of each modem may be wide enough to enable the modem to generate any wavelength in the optical spectrum. The modem may be configured to use any of duo-binary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. It is understood that for electronic channel discrimination, a tunable Rx is required. In nQAM and nPSK it is achieved using a linear receiver, i.e., a receiver where frequency mixing is taking place between a local oscillator and the incoming signal. The Local Oscillator (LO) needs to be tuned at the right frequency such that the mixing product can be at base band where all the necessary filtering will occur. If a receiver is not operating like above, it requires a tunable optical filter prior to the optical detector.

The modems can support programmable modulation, or constellations with both varying phase and/or amplitude. In an embodiment, the flexible optical modem can support multiple coherent modulation formats such as, for example, i) dual-channel, dual-polarization (DP) binary phase-shift keying (BPSK) for 100G at submarine distances, ii) DP quadrature phase-shift keying (QPSK) for 100G at ultra-long haul distances, iii) 16-quadrature amplitude modulation (QAM) for 200G at metro to regional (600 km) distances), iv) dual-channel 16QAM for 400G at metro to regional distances, and/or v) dual-channel 64QAM for 800G. Thus, in an embodiment, the same modem 300 can support 100G to 800G. With associated digital signal processing (DSP) in the modem hardware, moving from one modulation format to another is completely software-programmable. Of course, these are just examples of a modem, and those skilled in the art appreciate new modulation techniques are continually evolving and contemplated herewith/

Furthermore, with the DSP and software programming, the capacity of the flexible optical modem can be adjusted upwards or downwards in a hitless manner so as to not affect the guaranteed rate. Additionally, the modem can support various aspects of nonlinear effect mitigation and dispersion compensation (both for chromatic and polarization mode) in the electrical domain, thus eliminating external dispersion compensation devices, filters, etc. Modems can also adapt the forward error correction coding that is used, as another method to trade-off service rate versus noise tolerance.

Additionally, the modems can include any of an Interlaken interface, FlexE interface, and IMP interface. For chip-to-chip there is CAUI-4, CAUI-10 100GAUI-2 and OTL4.4 and OTL4.10 electrical lanes and the like. (OTLCn.4, SPI4.x). The electrical handoff implements various rates. And those rates can either be processed in bit, byte or frame order. This is where IMP comes in terms of processing in the modem.

Optical Multiplexing and Switching Layer

The present disclosure contemplates a grid or gridless (flex grid) center frequency map—the grid spacing, and width are typically found in lower-cost fixed-filter devices, colored or colorless—is the mux/demux port aligned to a fixed subset of the spectrum, direction-oriented or directionless—how non-blocking is the add-drop portion of the optical switch. Directionless switches typically drive additional components with additional cost, etc. Some spectrum blocking or contention-less—is the add-drop optical switch non-blocking WRT the use of overlapping spectrum in the add-drop structure. Optical switching with a blocking fabric or non-blocking fabric (as in a partially connected node). Fiber amplification characteristics: Specifically, fiber amplification start and stop frequencies. 4400 GHZ wide C-band, 4800 GHZ wide C-band, 6000 GHZ wide C-band, same for other frequency bands.

Router Port Traffic Control

Each router port has the ability to configure and select the port speed. These ports use the industry standard Ethernet rates (100G, 200G, 400G). There is an ability to channelize a port (not preferable) with standard ethernet rates. Fat pipes are always preferred over channelized interfaces.

The present disclosure can include running the router port interface at full rate. Then set the packet shaper for that interface to match the optical line interface, not the port speed. That is, we are matching shaper rate to optical line rate, not port rate. We do not want to have the modem client interface facing the router fabric that is receiving frames to tail drop the frame. Also, we update the IGP link metrics and/or SR TE policy with the optical line rate.

When we have a photonic layer that can dynamically redial connections (either via a control plane or network management solution or SDN controller or user) then it is very likely that the capacity of the restored link has less than the original link capacity given that the restoration path is generally longer than the original path. One of the things of note is that when the router port goes into the operationally UP state, the lower optical layer is interrogated, and the port shaper is aligned to the optical line rate. (Preferentially, it can be done beforehand if a controller is notified of a photonic link being reestablished.) Additionally, we need to readvertise the updated capacity information in the IGP (link TE DB) as well as update the SR TE policy.

IGP

IGP has awareness and exchange of network nodes and associated links, an understanding of each link's capacity, and the ability to specify (override or substitute an understanding of) the link capacity. We may need the ability to override the discovered rate of an interface that the Ethernet switching network thinks it sees is not the rate it should work at). This is very much needed when IMP (or other frame limiting mechanisms) comes into play where port speed does not equal link capacity.

Review

Ethernet standard interface rate waste optical capacity in the metro+ part of the network. A network study showed a 16+ % (30 Tb) boost with no extra cost. Today's variable optical capacity works with channelized interfaces, not fat pipes. Fat pipes are preferred for Ethernet. Even if you did it with fat pipes, the router needs to be told what's going on to prevent hyper aggregation. Need to make variable optical capacity work in reduced-capacity fat-pipe restoration scenarios.

The present disclosure can use a fat pipe instead of a channelized interface. Also, the present disclosure uses a combination of a standards-based off-the-shelf, highest-speed router ASIC interface speeds with port shaping and IMP to use and fill the optical line rate with no packet drops. IGP's link capacity to be the shaper rate (optical line rate), not the port speed. SR TE policies reflect the actual capacity, not the port speed.

Only some optical interface speeds align to Ethernet rates (e.g., where is 300G, 500G, . . . ). We provide a cost-effective recipe to get to these rates and keep the router happy and provide additional link capacity. We also restore link capacity *and* update the IGP with the true capacity. IGP topology remains the same, but link capacity may change and that is a problem.

We have demonstrated that variable router link capacity and altering router link capacity is not done correctly today. We can match the router link capacity with the optical network capacity in an efficient manner. (Using IMP and shaping). In today's network, link capacities are fixed. The coordinated effort of varying the optical wavelength capacity and correctly reflecting that in the router IGP is something that is not yet practiced today.

IP/MPLS Traffic Engineering

Traffic Engineering (TE) takes a network topology and traffic demand matrix as input, and through modeling determines best routes across the network that optimizes an objective function. The network topology includes the routers and the links including their capacity, delay, and various metrics. The typical objective function is to minimize maximum (i.e., worst) link utilization. However, the objective function may also minimize delay or overall capacity used across all the links. The traffic matrix can be obtained by analyzing network flow data, link utilizations, or direct measurements. The resulting model provides a set of traffic paths across the network. These paths can be explicit from each ingress router to egress router. These explicit paths can be provisioned using RSVP-TE or Segment Routing Policy. These resulting paths can also be implicit by computing and deploying as new link metrics. In this case, the network's IGP spreads the traffic according to these link metrics.

Multilayer Coordination Orchestration

The SDN IP application 122 can discover and keep a model of the network topology at IP and optical layers of the network and the links that connect the IP devices to the optical devices (these are called transitional links or interlayer links in the industry), and has access to applications like the variable capacity application 120. OTN and Ethernet layers can be added here. But we keep it out of our discussion for simplicity.

After detecting either underlying capacity change (e.g., fiber cut, optical equipment, or IP router/port/link failure) or workload change (e.g., traffic surge, congestion) SDN controller can execute the following procedure:

1. If there were fiber cut(s), see if the impacted IP link(s) can be full-capacity restored. Restore all the links that can be fully-capacity restored.
2. Run TE modeling and see if the congestion can be solved at the IP layer alone; if so, deploy new routes and exit
3. Identify the failed links that are not yet restored. These are candidate for partial-capacity restoration.
4. Invoke the variable capacity application 120 and determine the maximum possible capacity for these links. Do not yet change any capacity in the network.
5. Change the model of the network to reflect the new capacities.
6. Run TE modeling and determine the best possible routes in the network; if the resulting network is no longer congested, deploy the new routes, and partial-capacity restore the optical services and exit. Otherwise, go to step 7 (do nothing here).
7. Identify the congested links. There may be room to increase the capacity of some of the congested links.
8. Invoke the variable capacity application 120 and determine the maximum possible capacity of these links. Do not yet change any capacity in the network.
9. Change the model of the network to reflect the new capacities. At this time, the model reflects the new capacities of full-capacity restored, partial-capacity restored and congested links.
10. Run TE modeling and determine the best possible routes in the network deploy the new routes, and change the capacity of links (both congested and partial-capacity restored) according to steps 4 and 8.

Deploying new routes may perform some or all the following actions depending on the IP routing needs:

Change link capacity

Change link metrics (IGP, TE, delay, etc)

Change candidate paths in SR policy

Change RSVP-TE tunnels

In an embodiment, we choose to apply changes in batches, full-restorations, partial-restorations, and capacity increases of the congested links. These can be done in other orders, or one at a time while checking the impact using the TE App and stopping immediately after congestion is alleviated or continue as long as improvements to optimization is possible.

Additional step may include: If we are increasing the capacity of a working IP link at the optical layer, we should set the link metric to IGP's MAX_LINK_METRIC and wait until the link completes the transmission of the packets in flight and in its queue or until a timeout before performing the optical network changes. This is because capacity change is destructive to the packets in transit.

Figure 20:
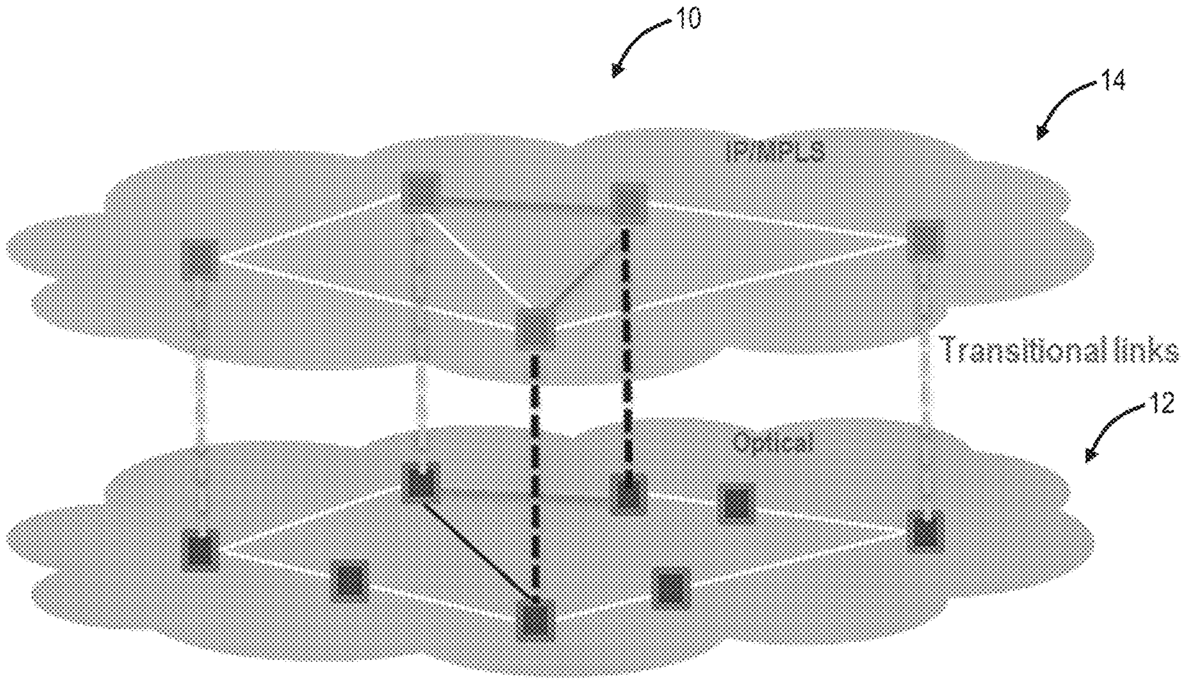
FIG. 20 is a diagram of a multi-layer use case for traffic engineering.

FIG. 20 is a diagram of a multi-layer use case for traffic engineering. Optimizing at the IP/MPLS layer 14 alone may not always succeed, especially with multiple fiber cuts. Adding capacity at the optical layer 12 may be necessary, Optical restoration is slow but can help, Partial restoration when full-restoration is not viable may be sufficient to alleviate congestion. Again, the capacity of some optical paths can be increased. New optical transport paths can be signaled. Given the current traffic demands and fiber-cuts (topology) we compute the ideal mix of IP and DWDM topology.

Figure 21:
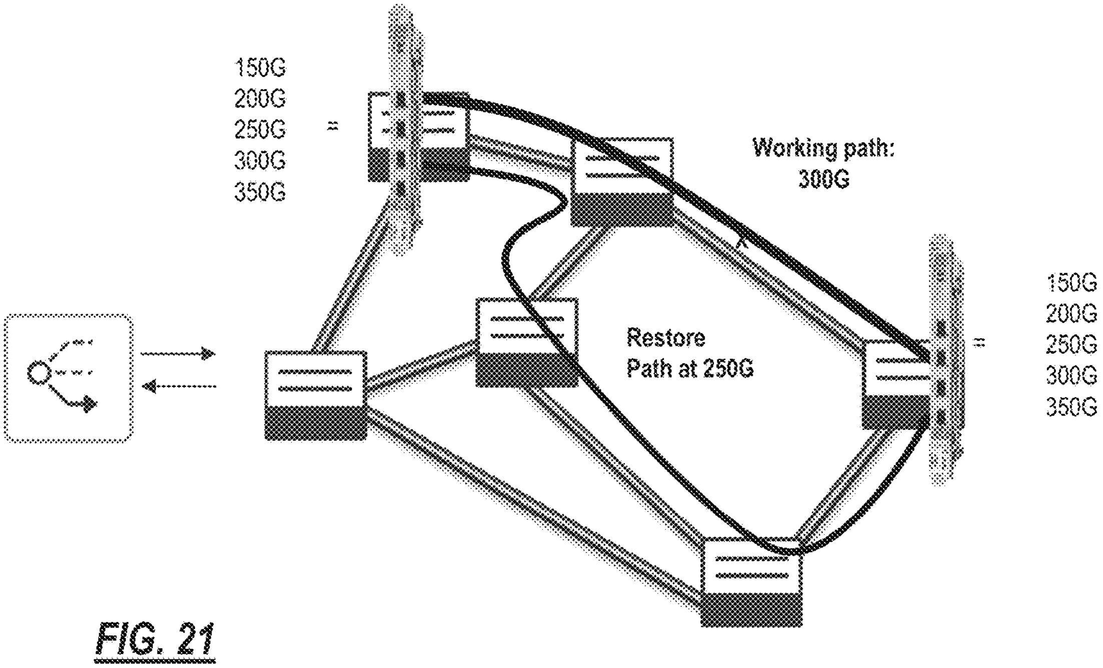
FIG. 21 is a diagram of coordinating variable capacity restoration with IP traffic engineering.

FIG. 21 is a diagram of coordinating variable capacity restoration with IP traffic engineering. After a fiber cut, a full-capacity optical restoration may not always be possible. Partial-capacity optical restoration helps but if done in isolation at the optical layer, IP layer will drop packets as it will assume full-capacity. Reducing link capacity alone at the IP layer will not balance the traffic, balancing requires running traffic engineering.

Hence variable capacity and IP traffic engineering needs to be coordinated. IP link capacity needs to be reduced. IP link metric needs to be increased. SR TE policy objects needs to be added/deleted/changed to balance traffic across all available paths.

Coordination Process

Figure 22:
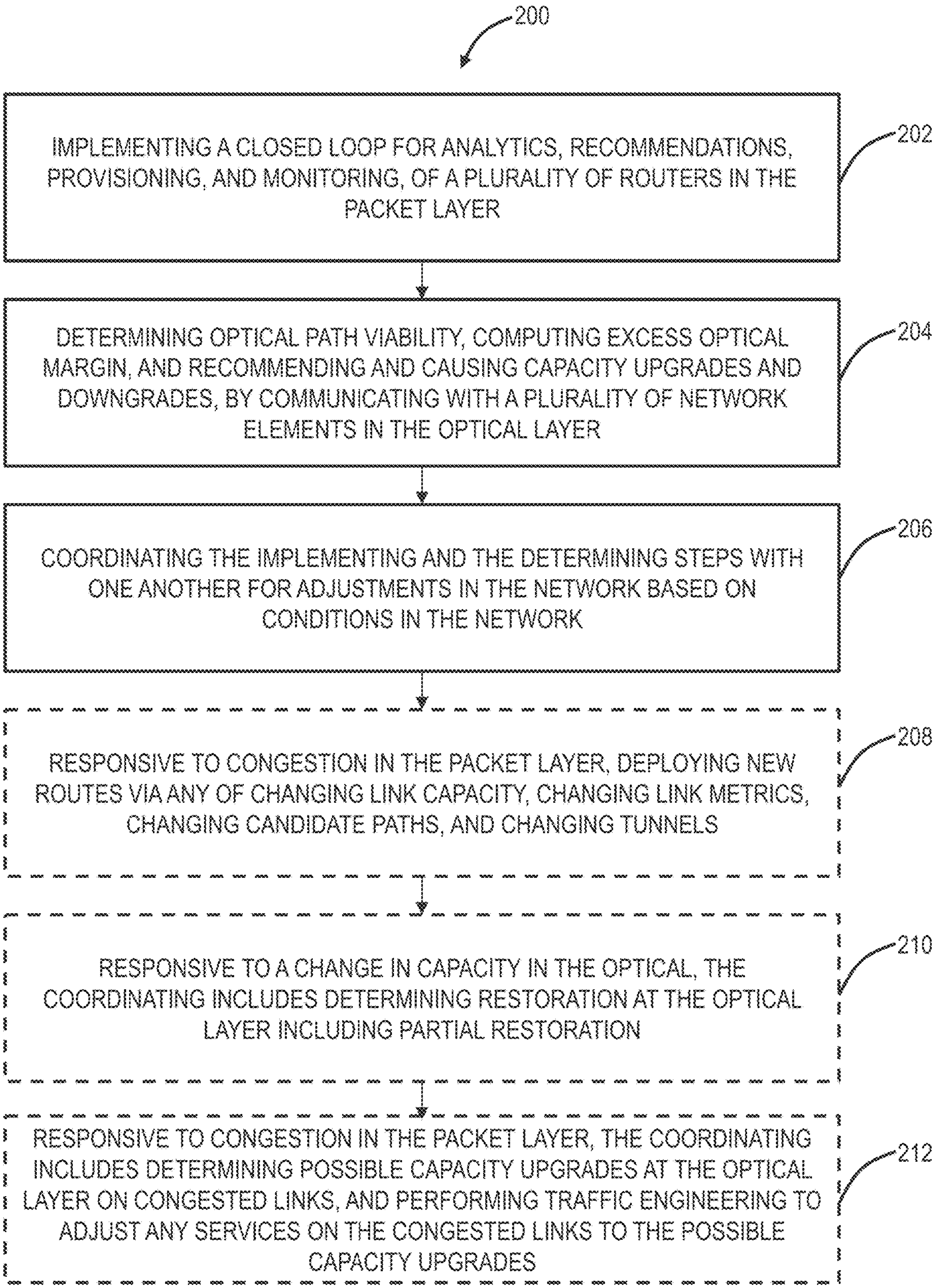
FIG. 22 is a flowchart of a process for coordinating the optical layer and the packet layer in the network.

FIG. 22 is a flowchart of a process 200 for coordinating the optical layer 12 and the packet layer 14 in the network 10. The process 200 contemplates implementation via the SDN controller 26, the variable capacity application 120, and the SDN IP application 122. Also, the process 200 can be implemented as a method with steps, via an apparatus having at least one processor to implement the steps, and as a non-transitory computer readable medium storing instructions that cause at least one processor to perform the steps.

The process 200 includes implementing a closed loop for analytics, recommendations, provisioning, and monitoring, of a plurality of routers in the packet layer (step 202); determining optical path viability, computing excess optical margin, and recommending and causing capacity upgrades and downgrades, by communicating with a plurality of network elements in the optical layer (step 204); and coordinating the implementing and the determining steps with one another for adjustments in the network based on conditions in the network (step 206). The coordinating is based on underlying capacity changes in the optical layer and workload changes in the packet layer.

The process 200 can further include, responsive to congestion in the packet layer, deploying new routes via any of changing link capacity, changing link metrics, changing candidate paths, and changing tunnels (step 208). The process 200 can further include, responsive to a change in capacity in the optical, the coordinating includes determining restoration at the optical layer including partial restoration (step 210). The partial restoration can include determining a path with a possible capacity and performing traffic engineering to adjust any services to the possible capacity. The process 200 can further include, responsive to congestion in the packet layer, the coordinating includes determining possible capacity upgrades at the optical layer on congested links, and performing traffic engineering to adjust any services on the congested links to the possible capacity upgrades (step 212).

The process 200 can further include communicating with an SDN controller that communicates with the network. The process 200 can further include implementing changes in the optical layer and the packet layer by the SDN controller; and setting link metrics to protect packets in flight prior to any changes at the optical layer. Adjustments in the packet layer from the SDN IP application can include utilizing non-standard Ethernet rates. The non-standard Ethernet rates can be set by setting a shaper on a router interface to match an optical line rate.

Notes

The approaches described herein can work with traditional channelization in Ethernet and without.

The present disclosure contemplates both a top down and bottom up solution. Bottom up can include optical spectrum optimization, bandwidth change at the optical layer, and then physical reconfiguration at the packet layer.

For top down, only the IP network knows where the additional capacity is useful. So, the present disclosure can coordinate this knowledge in IP network with what can be feasibly done at the optical layer. One way to think about it there is the variable capacity application 120 and the SDN IP application 122, and a master coordination app. Coordination app top down orchestrates this work. The coordination can assist coordinating anything between layers, e.g., latency.

In an implementation, one can choose to invoke TE based on a timer or based on congestion detection. If there is no congestion, there is no problem to solve until a re-optimization timer kicks in.

CONCLUSION

Of note, reference is made herein to SDN controllers, SDN applications, L0CP, NMS, etc. Those skilled in the art will recognize the various processes described herein can be performed by any processing device or software entity capable of communicating to various elements in the network needed for service operations. Also, the terms SDN IP application and variable capacity application are used herein to describe the functionality; those skilled in the art will appreciate other names can be assigned to these applications.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A controller comprising:

an interface to a router and an optical line system;

one or more processors communicatively coupled to the interface; and memory comprising instructions that, when executed, cause the one or more processors to determine and configure an optical line connected to the optical line system to a viable rate, configure a router interface on the router to communicate on the optical line based on the viable rate, and set an Interior Gateway Protocol (IGP) link capacity of the router interface equal to the viable rate of the optical line, wherein a highest support rate of the router interface is higher than the viable rate.

2. The controller of claim 1, wherein a shaper on the router interface is set to the viable rate.

3. The controller of claim 1, wherein the interface on the router is set to a highest possible Ethernet rate supported and a shaper on the interface is set to the viable rate.

4. The controller of claim 3, wherein the highest possible Ethernet rate is greater than the viable rate.

5. The controller of claim 1, wherein the instructions that, when executed, further cause the one or more processors to configure the optical line with Idle Mapping Procedure (IMP) so that the optical line adapts to a rate of the router interface.

6. A method for programming a router and an optical line system to perform steps of:

determining and configuring an optical line connected to the optical line system to a viable rate;

configuring a router interface on the router to communicate on the optical line based on the viable rate, wherein a shaper on the router interface is set to the viable rate; and setting an Interior Gateway Protocol (IGP) link capacity of the router interface equal to the viable rate of the optical line.

7. The method of claim 6, wherein the interface on the router is set to a highest possible Ethernet rate supported and a shaper on the interface is set to the viable rate.

8. A controller comprising:

an interface to a router and an optical line system;

one or more processors communicatively coupled to the interface; and memory comprising instructions that, when executed, cause the one or more processors to determine and configure an optical line connected to the optical line system to a viable rate, and configure a router interface on the router to communicate on the optical line based on the viable rate, wherein the interface on the router is set to a highest possible Ethernet rate supported and a shaper on the interface is set to the viable rate, wherein the highest possible Ethernet rate is greater than the viable rate.

9. The controller of claim 8, wherein a shaper on the router interface is set to the viable rate.

10. The controller of claim 9, wherein the instructions that, when executed, further cause the one or more processors to set an Interior Gateway Protocol (IGP) link capacity of the router interface equal to the viable rate of the optical line.

11. The controller of claim 10, wherein a highest support rate of the router interface is higher than the viable rate.

12. The controller of claim 8, wherein the interface on the router is set to a highest possible Ethernet rate supported and a shaper on the interface is set to the viable rate.

13. The controller of claim 12, wherein the highest possible Ethernet rate is greater than the viable rate.

14. The controller of claim 8, wherein the instructions that, when executed, further cause the one or more processors to configure the optical line with Idle Mapping Procedure (IMP) so that the optical line adapts to a rate of the router interface.

* * * * *